(12) United States Patent
Tsujimoto et al.

(10) Patent No.: US 8,690,509 B2
(45) Date of Patent: *Apr. 8, 2014

(54) ARTICLE STORAGE FACILITY

(75) Inventors: Kazushi Tsujimoto, Omihachiman (JP); Yuichi Ueda, Yasu (JP); Takashi Fujita, Higashiomi (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/303,791

(22) Filed: Nov. 23, 2011

(65) Prior Publication Data

US 2012/0070255 A1    Mar. 22, 2012

Related U.S. Application Data

(63) Continuation of application No. 12/178,096, filed on Jul. 23, 2008, now Pat. No. 8,162,585.

(30) Foreign Application Priority Data

Jul. 26, 2007    (JP) ................................ 2007-194990

(51) Int. Cl.
  *B65G 1/00*    (2006.01)
(52) U.S. Cl.
  USPC .......................................... 414/273; 414/940
(58) Field of Classification Search
  None
  See application file for complete search history.

(56) References Cited

U.S. PATENT DOCUMENTS

| | | |
|---|---|---|
| 2,840,187 A | 6/1958 | Bianca |
| 3,746,189 A | 7/1973 | Burch et al. |
| 3,792,758 A | 2/1974 | Wentz |
| 4,113,119 A | 9/1978 | Brown et al. |
| 4,466,765 A | 8/1984 | Mautino |
| 5,226,782 A | 7/1993 | Rigling |
| 6,042,322 A | 3/2000 | Piccini |
| 7,257,463 B2 | 8/2007 | Taguchi et al. |
| 7,575,407 B2 | 8/2009 | Tsujimoto |
| 8,162,585 B2 * | 4/2012 | Tsujimoto et al. ............ 414/273 |
| 2004/0228709 A1 | 11/2004 | Ueda |
| 2004/0228710 A1 | 11/2004 | Ueda |
| 2005/0053450 A1 | 3/2005 | Kantola et al. |
| 2006/0182550 A1 | 8/2006 | Lee |

FOREIGN PATENT DOCUMENTS

| | | |
|---|---|---|
| DE | 1044712 | 11/1958 |
| DE | 3533063 A1 | 3/1987 |
| DE | 4238322 A1 | 5/1994 |
| DE | 4242811 A1 | 6/1994 |
| GB | 2264292 A | 8/1993 |
| JP | 6293404 A | 10/1994 |

(Continued)

*Primary Examiner* — Joshua Rudawitz

(74) *Attorney, Agent, or Firm* — The Webb Law Firm

(57) ABSTRACT

An article storage facility includes a storage rack that includes a plurality of storage units that store articles; a first article transport that includes a first vertically movable body guided by a first vertical guide and a first transit body configured to move along a path defined along the storage rack, the first vertical guide being provided in the first article transport so as to be positioned on one side of a lateral direction of the path; and a second article transport that includes a second vertically movable body guided by a second vertical guide and a second transit body configured to move along the path, the second vertical guide being provided in the second article transport so as to be positioned on the other lateral side of the path. The first transit body and the second transit body are configured so as to be able to pass each other.

11 Claims, 18 Drawing Sheets

(56) References Cited

FOREIGN PATENT DOCUMENTS

| JP | 06305514 | | 11/1994 |
|---|---|---|---|
| JP | 2000351411 | A | 12/2000 |
| JP | 2001163408 | A | 6/2001 |
| JP | 2007015780 | | 1/2007 |
| JP | 2007126258 | | 5/2007 |
| JP | 2007137599 | A | 6/2007 |

* cited by examiner

FIG.8
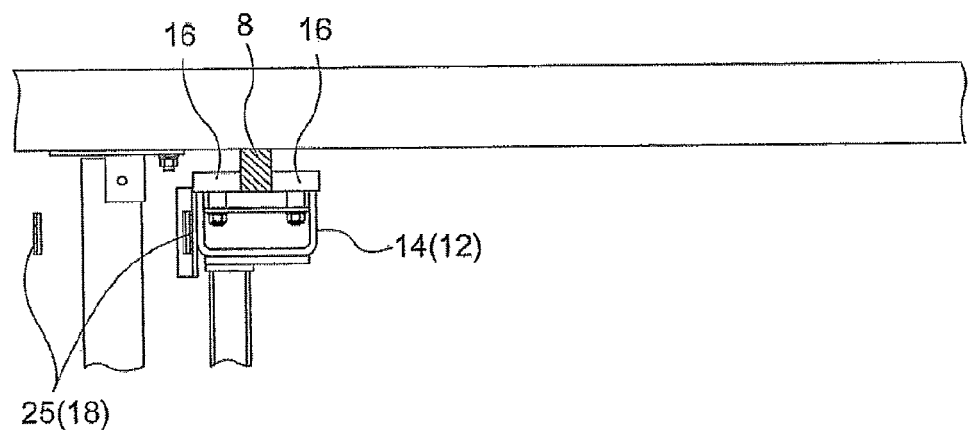
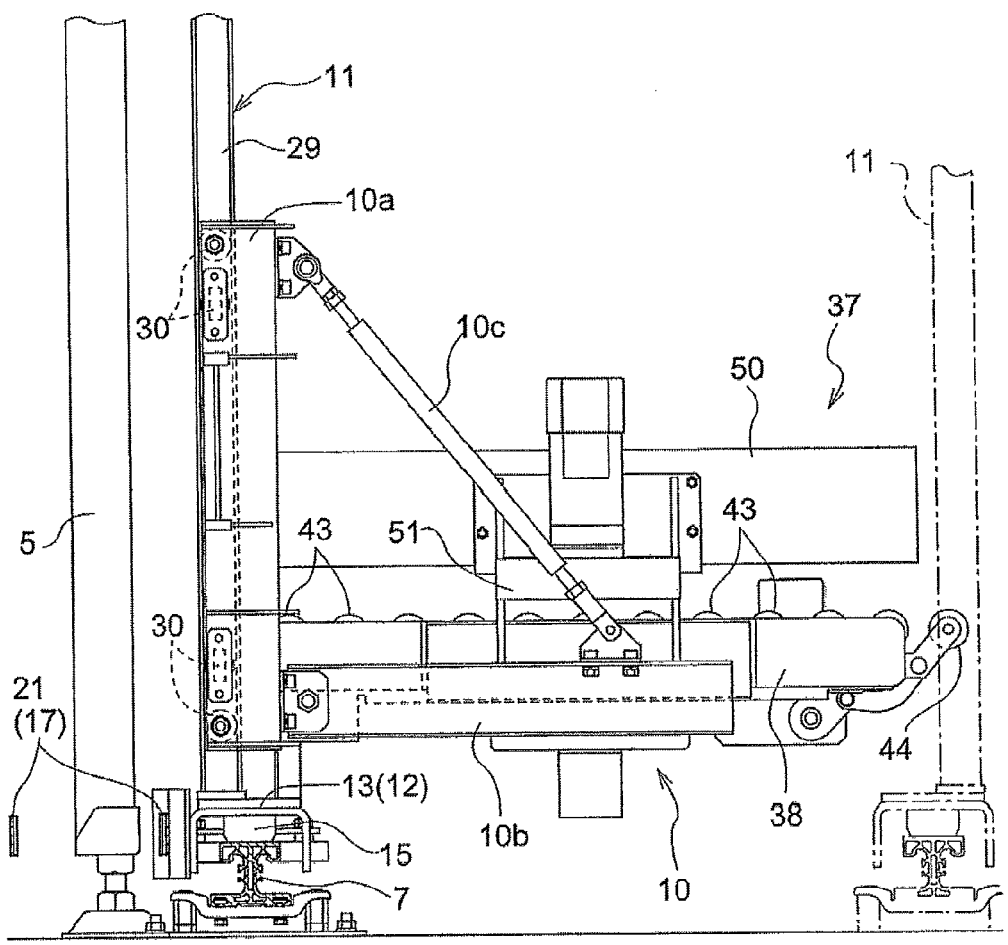

FIG.17
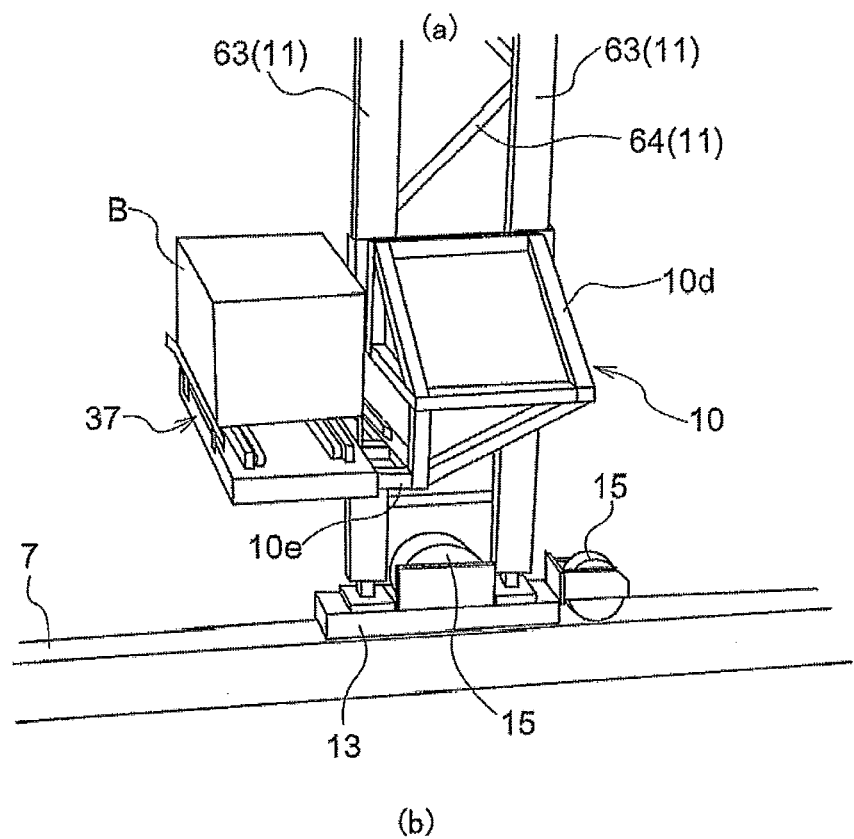
(a)
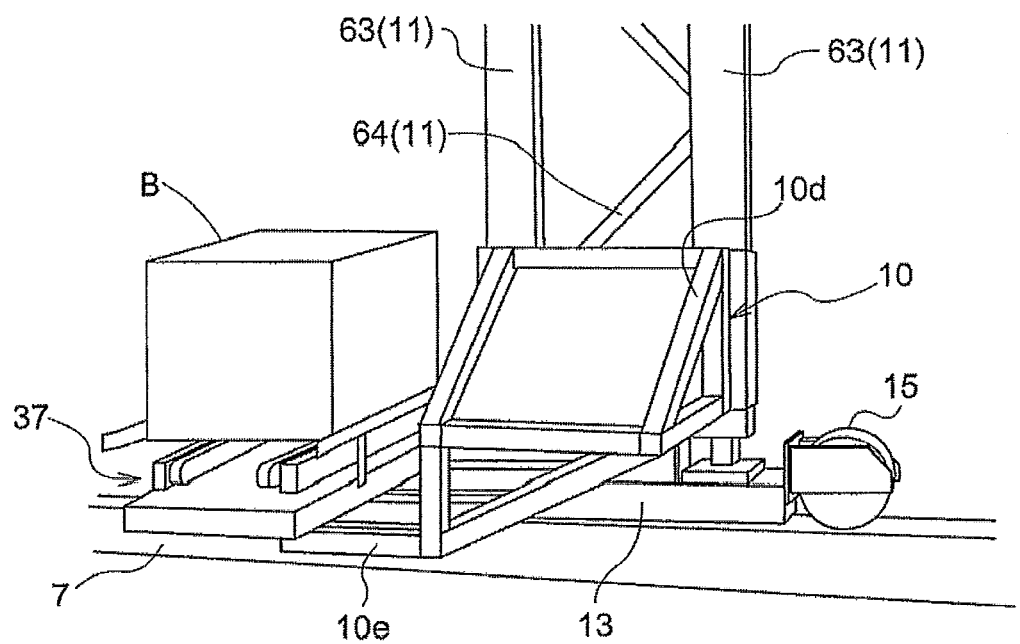
(b)

ARTICLE STORAGE FACILITY

CROSS-REFERENCE TO RELATED APPLICATIONS

This application is a continuation of U.S. patent application Ser. No. 12/178,096, filed on Jul. 23, 2008, which is hereby incorporated by reference in its entirety.

BACKGROUND OF THE INVENTION

The present invention relates to an article storage facility, and more particularly to an article storage facility provided with a storage rack including a plurality of storage units that store articles and that are arranged in the vertical and horizontal directions, an vertically movable body guided to be allowed to move vertically by an vertical guide, and a transit body configured to move along a path defined along the storage rack.

With an article storage facility as described above, an article transport moves the vertically movable body to a position corresponding to one of the storage units with which a transfer is to be carried out through movement of the transit body and the vertical movement of the vertically movable body, and transfers (stores and removes) articles between the vertically movable body and the storage units. The article transport fetches articles from the storage units or stores articles in the storage units in this manner.

Such article storage facilities are provided with multiple article transports in the path in order to improve the transport capabilities. However, when multiple article transports are provided in the path, the movement ranges of two of the article transports will interfere with each other, and thus it is necessary to prevent the article transports from colliding with each other by limiting the movement of one of the article transports. Therefore, simply providing multiple article transports in the path may not achieve an improvement in the transport capabilities, as the multiple article transports cannot be moved with efficiency.

Accordingly, there is a conventional article storage facility provided with first and second article transports in the path, configured so that the first and second article transports can pass each other. The first and second article transports can therefore be moved with efficiency by causing them to pass each other when their respective movement ranges interfere with each other (for example, see JP H06-305514A).

In this conventional article storage facility, moving vertical guides past each other is made possible by disposing the vertical guide of the first article transport on one side in the lateral direction of the path and disposing the vertical guide of the second article transport on the other side in the lateral direction of the path. With respect to the transit bodies, the transit body of the first article transport and the transit body of the second article transport are disposed in the lateral direction in the path with a space provided therebetween, which makes it possible for the transit bodies to pass each other.

The vertically movable body is of a length that laterally spans the entire path, and is supported by the vertical guide capable of rotating, central to the vertical axis, between an article transfer orientation in which articles are transferred to or from a storage unit and a movement position used when moving through the path. In the article transfer orientation, the vertically movable body is positioned spanning the entire lateral length of the path by causing the lengthwise direction of the vertically movable body to match up with the lateral direction of the path, whereupon articles are transferred to or from a storage unit. Meanwhile, in the movement position, the dimension of the vertically movable body in the lateral direction of the path is reduced by causing the lengthwise direction of the vertically movable body to match up with the lengthwise direction of the path, and the vertically movable body is positioned so as not to come into contact with the vertically movable body and vertical guide of the opposing article transport in the lateral direction of the path, thereby making it possible for the vertically movable bodies to pass each other. Accordingly, the conventional article storage facility makes it possible for the first and second article transports to pass each other by switching the vertically movable body of the first article transport and the vertically movable body of the second article transport into movement positions.

The abovementioned conventional article storage facility makes it possible for the first and second article transports to pass each other while exchanging articles with storage units by switching the vertically movable bodies between an article transfer orientation and a movement position. However, it is necessary to add a structure for switching the vertically movable body between the article transfer orientation and the movement position, which leads to a more complicated configuration.

Furthermore, the conventional article storage facility makes it possible to transfer articles to or from storage units of storage rack provided on both sides of the lateral direction of the path by switching the vertically movable body to the article transfer orientation and thereby positioning the vertically movable body spanning the entire lateral length of the path. However, when the vertically movable body of one of the first and second article transports is switched into the article transfer orientation, the other article transport becomes unable to pass the other article transport. Therefore, while one of the first and second article transports is exchanging articles with a storage unit, it is necessary to constantly limit the movement of the other article transport, and thus the first and second article transports cannot be efficiently moved; it may therefore not be possible to improve the transport capabilities.

SUMMARY OF THE INVENTION

It is an object of the present invention to resolve at least one of the problems with the conventional technology described above.

The article storage facility according to the present invention comprises a storage rack that includes a plurality of storage units that store articles and that are aligned in vertical and horizontal directions; a first article transport that includes a first vertically movable body guided by a first vertical guide extending in the vertical direction to allow the first vertically movable body to move vertically and a first transit body configured to move along a path defined along said storage rack, the first vertical guide being provided in said first article transport so as to be positioned on one side of a lateral direction of the path; and a second article transport that includes a second vertically movable body guided by a second vertical guide extending in the vertical direction to allow the second vertically movable body to move vertically and a second transit body configured to move along the path, the second vertical guide being provided in said second article transport so as to be positioned on the other side of the lateral direction of the path, wherein said first transit body and said second transit body are configured so as to be able to pass each other; when viewed in the lengthwise direction of the path, said first vertical guide has a first surface that opposes said second vertical guide, said second vertical guide has a second surface that opposes said first vertical guide, and a distance between the first surface and the second surface when viewed in the lengthwise direction of the path is a set distance;

when the first vertically movable body is supported by the first vertical guide in an article transfer orientation for transferring one or more articles to or from one of the storage units, and the second vertically movable body is supported by the second vertical guide in its article transfer orientation, a first dimension at which the first vertically movable body protrudes with respect to the first surface of the first vertical guide is less than the set distance, and a second dimension at which the second vertically movable body protrudes with respect to the second surface of the second vertical guide is less than the set distance; and a sum of the first dimension and the second dimension is greater than the set distance.

BRIEF DESCRIPTION OF THE DRAWINGS

FIG. 8 is a diagram showing an enlarged view of essential elements of the first stacker crane in the lengthwise direction of the path;

FIG. 17 is a diagram showing an enlarged view of essential elements of a stacker crane according to a third embodiment.

DETAILED DESCRIPTION OF PREFERRED EMBODIMENTS

Embodiments of an article storage facility according to the present invention will be described with reference to the drawings. Although multiple embodiments will be described hereinafter, a combination of the characteristics of one embodiment with the characteristics of another embodiment is also considered to be within the scope of the present invention.

(First Embodiment)

Figure 1:
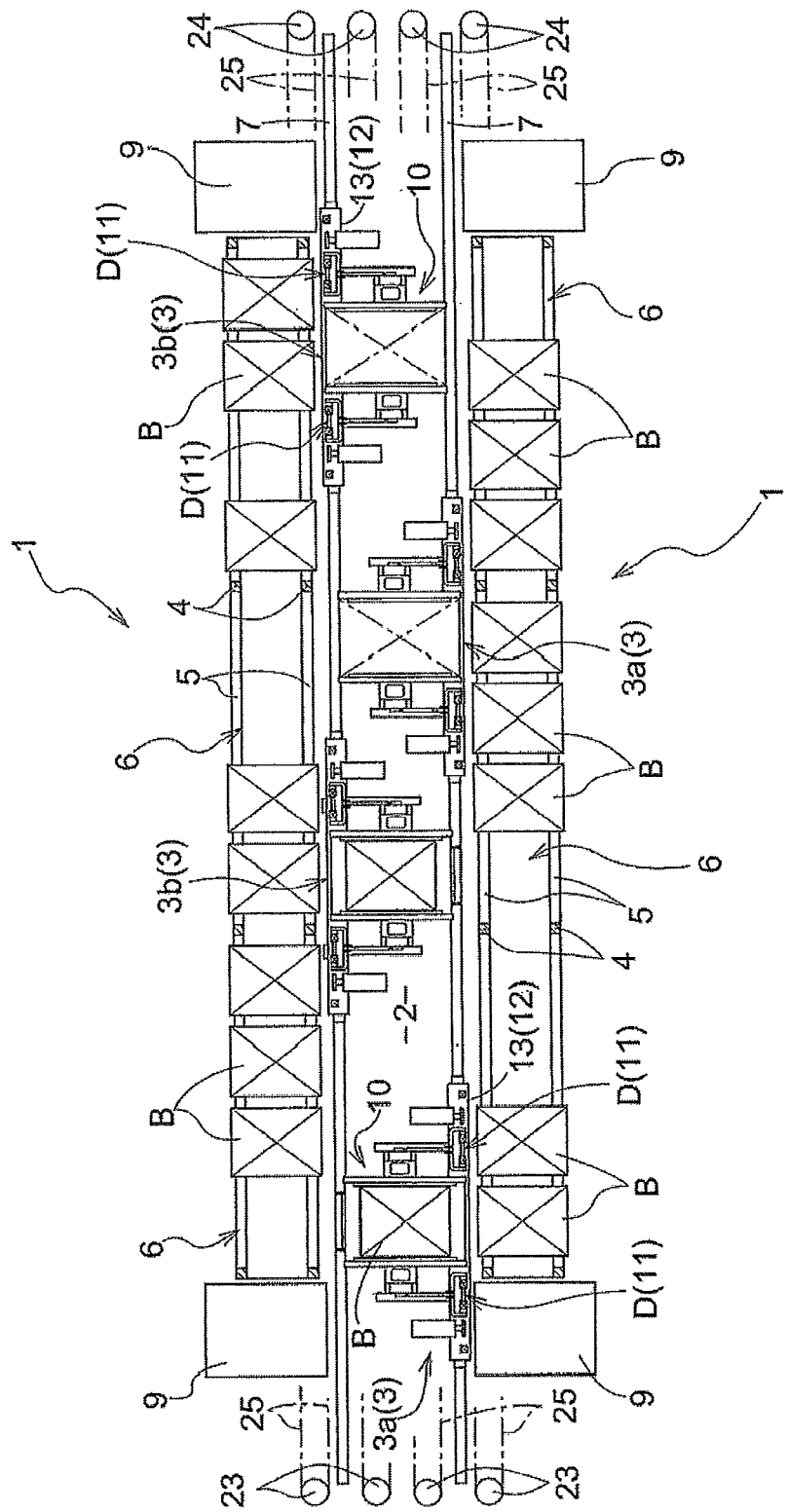
FIG. 1 is a plan view of an article storage facility.
Figure 2:
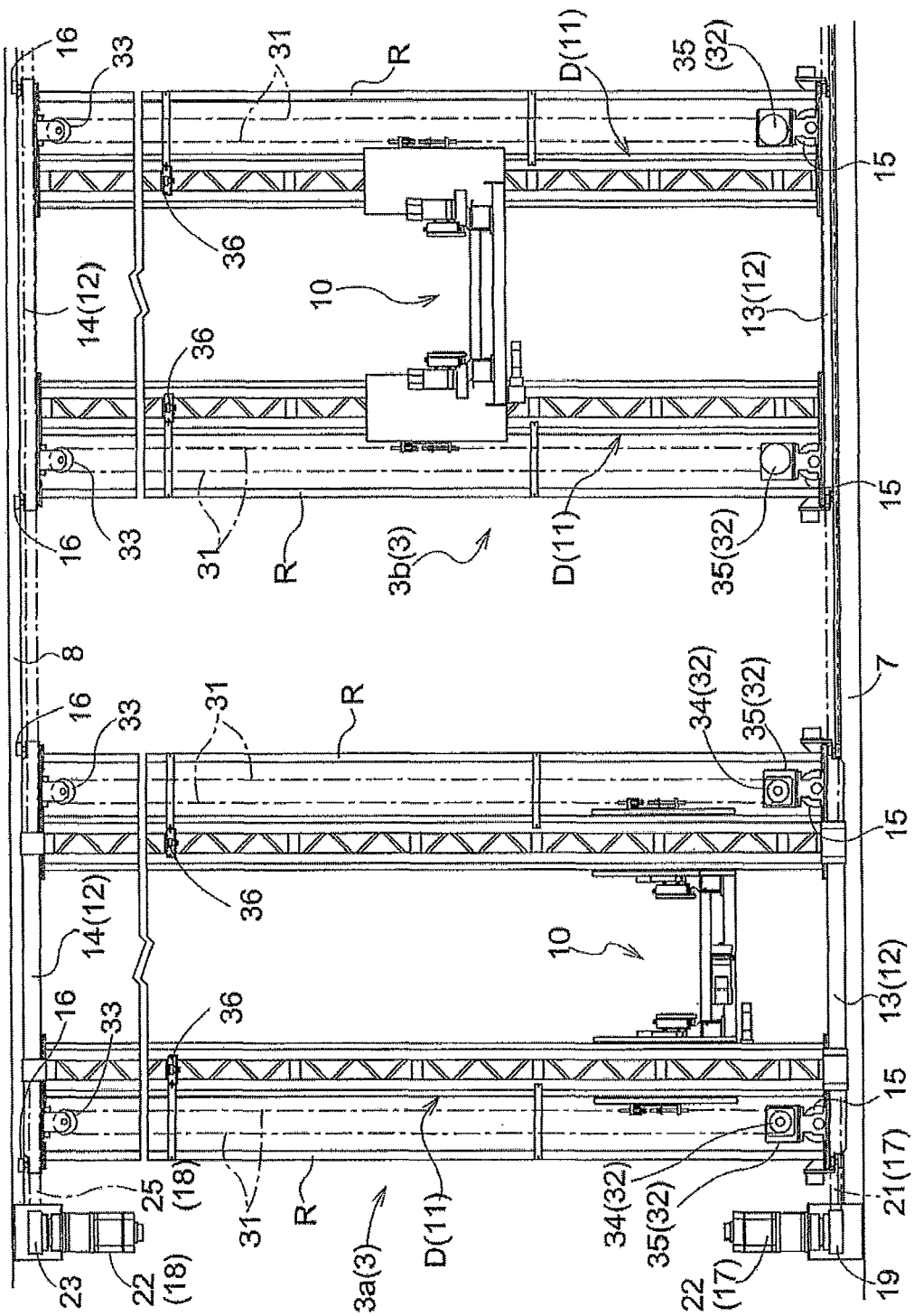
FIG. 2 is a diagram illustrating a first stacker crane and a second stacker crane in the lateral direction of the path.

As illustrated in FIG. 1, an article storage facility according to the first embodiment includes: two storage racks 1 disposed with a space therebetween so that the sides of the rack into/from which articles are inserted/removed oppose each other; and stacker cranes 3, serving as article transports, capable of moving on a path 2 formed in line with the two storage racks 1 between the storage racks 1.

Figure 3:
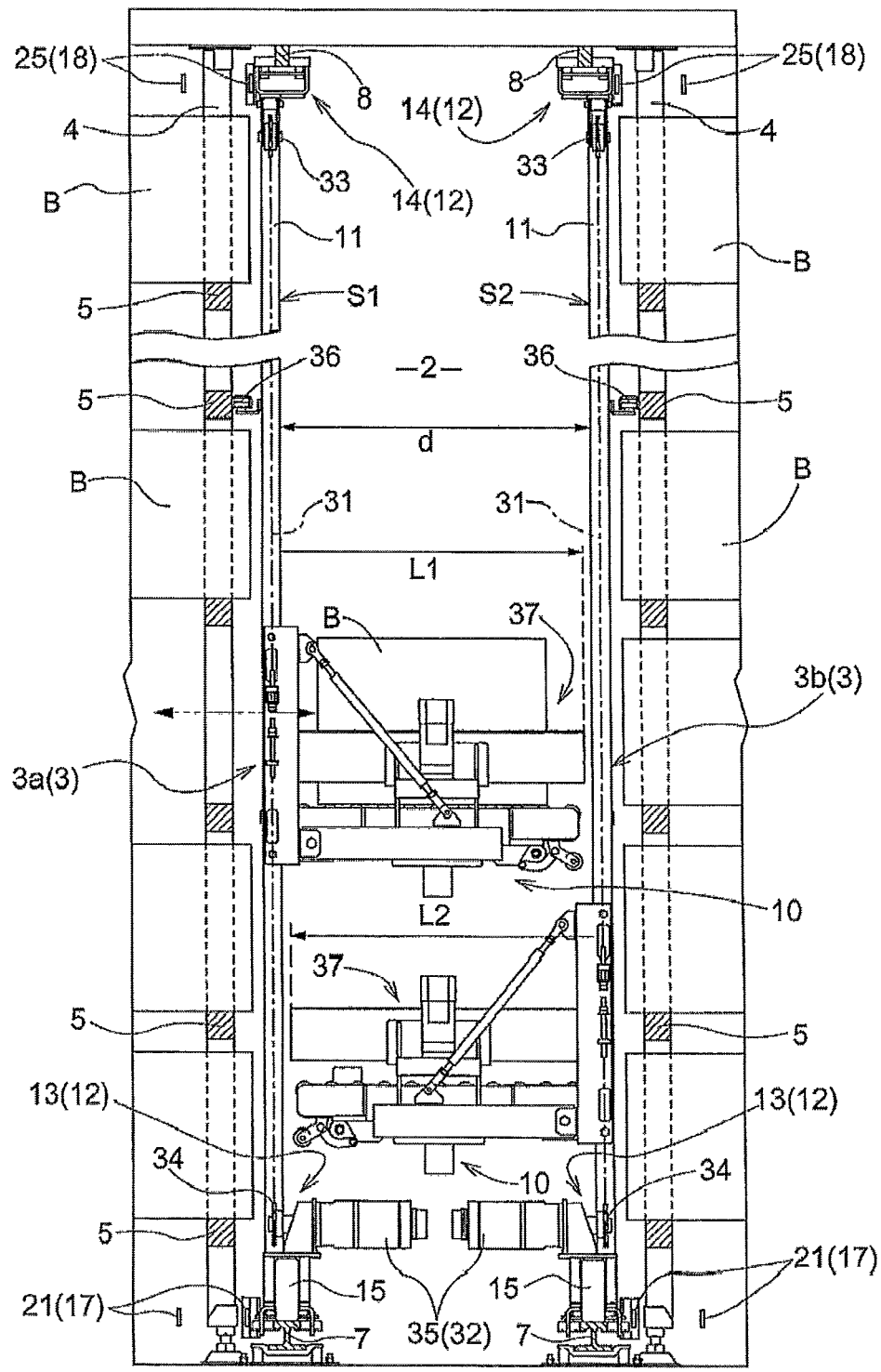
FIG. 3 is a diagram illustrating the first stacker crane and the second stacker crane in the lengthwise direction of the path.

Each storage rack 1 is, as shown in FIGS. 1 and 3, configured of a plurality of support columns 4 erected at intervals in the horizontal direction, and front and back beams 5, for mounting articles, provided spanning across plural support columns 4 arranged in the horizontal direction. Each storage rack 1 includes a plurality of storage units 6 that store articles B and that are arranged in both the vertical and horizontal directions. The storage units 6 are configured such that the articles B are stored such that the articles B are mounted upon and are supported by the front and back beams 5.

As shown in FIGS. 2 to 5, lower guide rails 7 are provided on the lower side in the path 2, while upper guide rails 8 are provided on the upper side in the path 2. The lower guide rails 7 and the upper guide rails 8 are respectively disposed on both sides of the lateral direction of the path 2, following the lengthwise direction of the path 2. Storage/retrieval portions 9 that support articles B being stored in the storage rack 1 and articles B being retrieved from the storage racks 1 are provided at both ends of each storage rack 1 in the lengthwise direction of the path 2 (see FIG. 1). Each stacker crane 3 is provided so as to be movable across the entire length of its storage rack 1 and the storage/retrieval portions 9, while being guided by its lower guide rail 7 and the upper guide rail 8.

Each stacker crane 3 is configured so as to guide an vertically movable body 10 in order to elevate/descend using an vertical guide 11 extending in the vertical direction, and is also configured so as to make round trips within the path 2 using the transit body 12. Two stacker cranes 3 are provided: a first stacker crane 3a that disposes an vertical guide 11 on one side of the lateral direction of the path 2, and a second stacker crane 3b that disposes an vertical guide 11 on the other side of the lateral direction of the path 2. As shown in FIG. 3, when viewed from the lengthwise direction of the path 2, the distance between a surface S1 (a first surface) of the vertical guide 11 of the first stacker crane 3a that faces the vertical guide 11 of the second stacker crane 3b and a surface S2 (a second surface) of the vertical guide 11 of the second stacker crane 3b that faces the vertical guide 11 of the first stacker crane 3a is a set distance d. When the first surface S1 and the second surface S2 are not aligned on a straight line when viewed in the lengthwise direction of the path 2, the set distance d may be set as the distance between the portions of the first surface S1 and the second surface S2 that are closest to each other. At least one of the first stacker crane 3a and the second stacker crane 3b is provided in plural along the path 2. In the present embodiment, two each of the first stacker crane 3a and the second stacker crane 3b are provided along the path 2, as shown in FIG. 1. However, one each of the first stacker crane 3a and the second stacker crane 3b may be provided, or three or more may be provided; further still, differing numbers of first stacker cranes 3a and second stacker cranes 3b may be provided as well. The first stacker crane 3a corresponds to a first article transport, whereas the second stacker crane 3b corresponds to a second article transport.

Hereinafter, descriptions regarding the first stacker crane 3a and the second stacker crane 3b will be added. First, the relationships between the transit bodies 12, vertical guides 11, and vertically movable bodies 10 and the first stacker crane 3a and second stacker crane 3b will be described.

Figure 4:
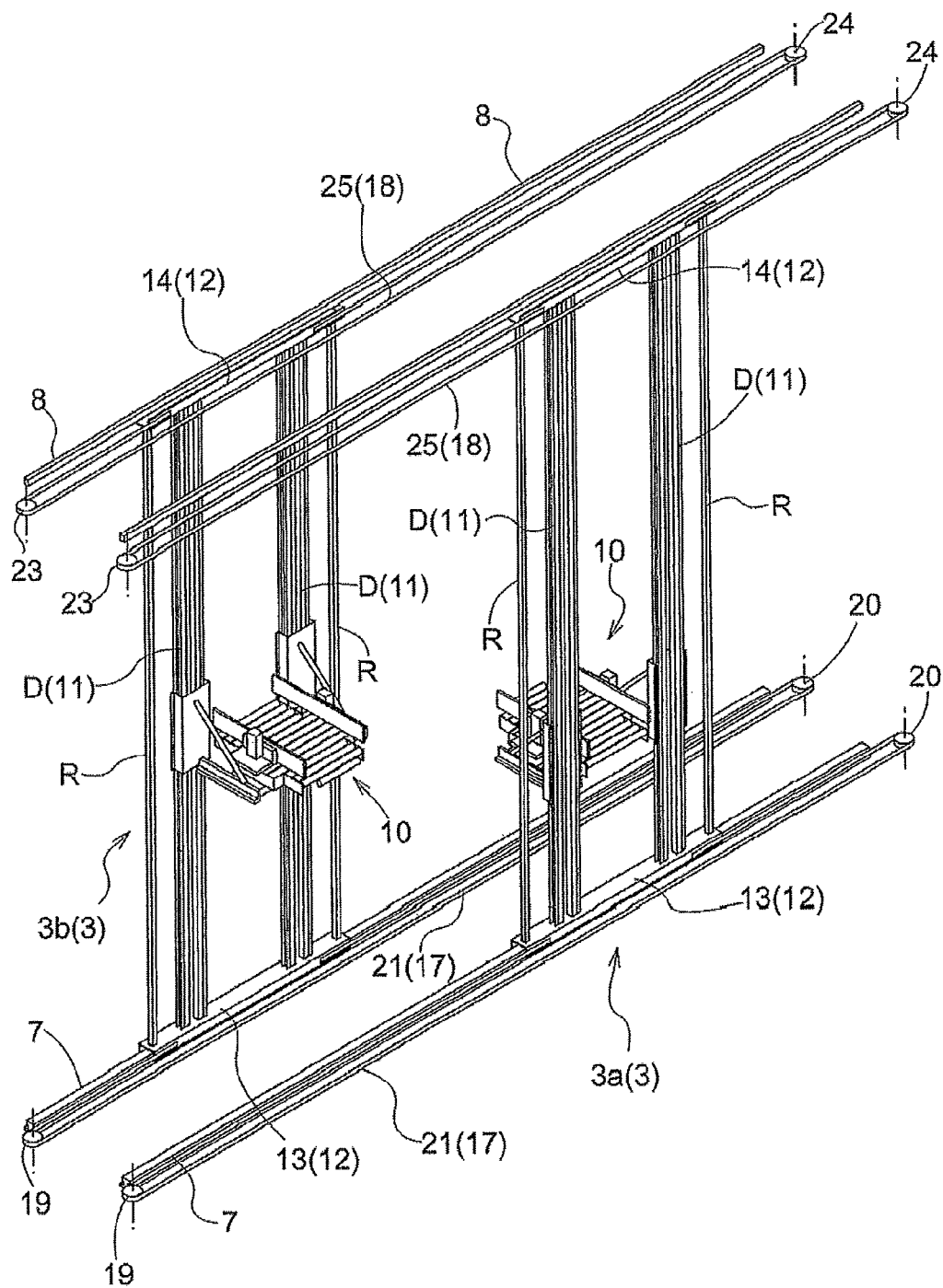
FIG. 4 is a perspective view showing an outline of the first stacker crane and the second stacker crane.
Figure 5:
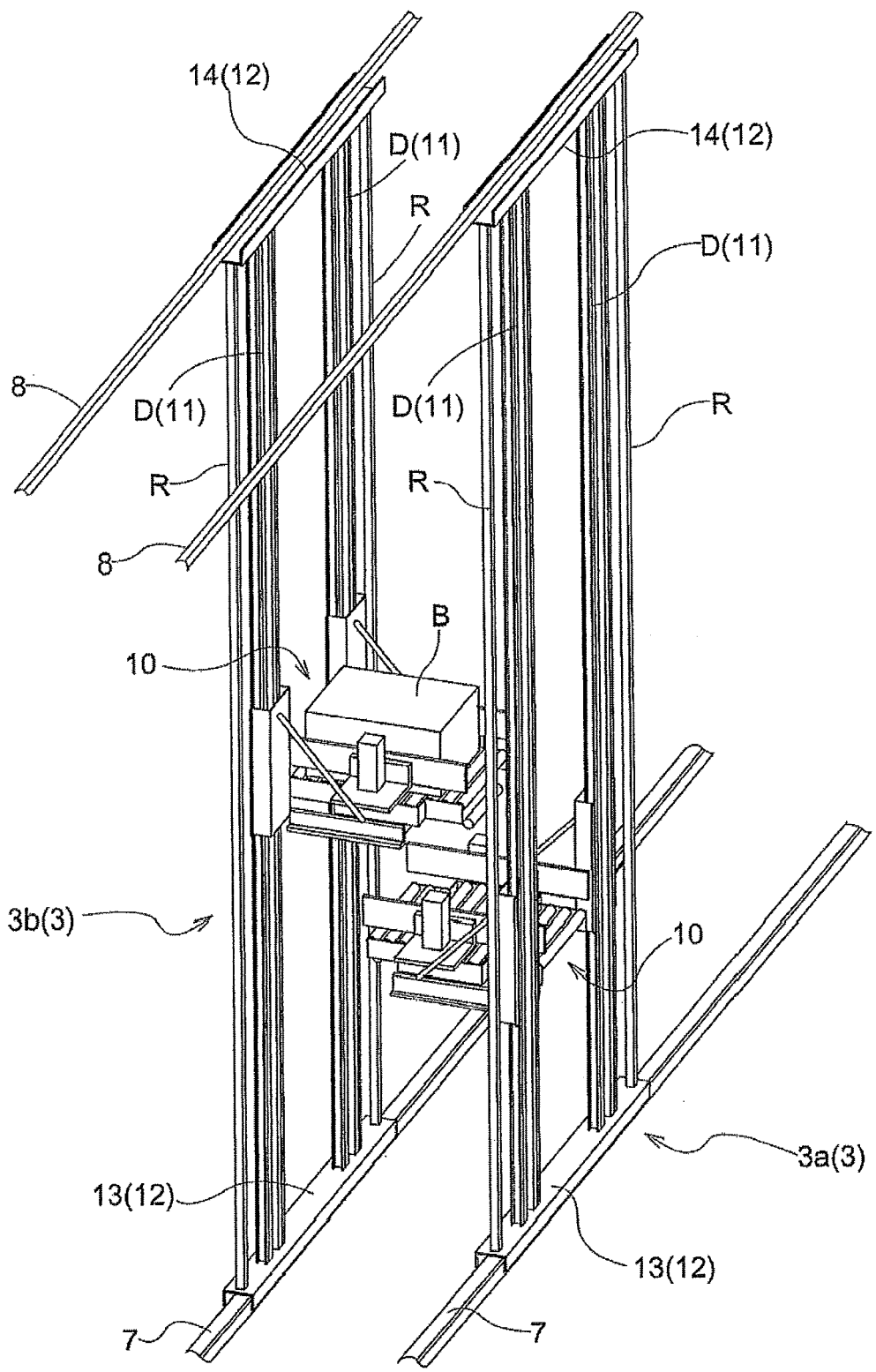
FIG. 5 is another perspective view showing an outline of the first stacker crane and the second stacker crane.

The transit body 12 provided in the first stacker crane 3a is configured, as shown in FIGS. 3 to 5, so as to move back and forth along the path 2, while being guided by the lower guide rail 7 and the upper guide rail 8 disposed on one side of the lateral direction of the path 2. Meanwhile, the transit body 12 provided in the second stacker crane 3b is configured so as to move back and forth along the path 2 while being guided by the lower guide rail 7 and the upper guide rail 8 disposed on the other side of the lateral direction of the path 2. In this manner, the transit bodies 12 provided in the first stacker crane 3a and the second stacker crane 3b, respectively, are disposed at intervals in the lateral direction of the path 2, and can thus pass each other. In other words, a first stacker crane 3a and a second stacker crane 3b can be disposed in the same position in the lengthwise direction of the path 2 without coming into contact with each other.

The vertical guide 11 provided in the first stacker crane 3a is disposed at the end thereof on one side of the lateral direction of the path 2. Meanwhile, the vertical guide 11 provided in the second stacker crane 3b is disposed at the end thereof on the other side of the lateral direction of the path 2. In this manner, the first stacker crane 3a and the second stacker crane 3b are configured so that the vertical guides 11 provided therein are positioned at the ends of the lateral direction of the path 2.

The vertically movable bodies 10 provided in the first stacker crane 3a and the second stacker crane 3b, respectively, are supported by the vertical guides 11 so as to be in an article transfer orientation in which articles B are exchanged (stored and removed) between the storage units 6 and the storage/retrieval portions 9. When being supported by the vertical guide 11, the vertically movable body 10 provided in the first stacker crane 3a is disposed so that it has portions that overlap with the vertically movable body 10 of the second stacker crane 3b in the lateral direction of the path 2 and so that it protrudes toward the side on which the second stacker crane 3b is provided to an extent in which it does not make contact with the vertical guide 11 of the second stacker crane 3b. The vertically movable body 10 provided in the first stacker crane 3a is supported by the vertical guide 11, protruding in a cantilever state in the direction of the second stacker crane 3b. Meanwhile, when being supported by the vertical guide 11, the vertically movable body 10 provided in the second stacker crane 3b is disposed so that it has portions that overlap with the vertically movable body 10 of the first stacker crane 3a in the lateral direction of the path 2 and so that it protrudes toward the side on which the first stacker crane 3a is provided to an extent in which it does not make contact with the vertical guide 11 of the first stacker crane 3a. The vertically movable body 10 provided in the second stacker crane 3b is supported by the vertical guide 11, protruding in a cantilever state in the direction of the first stacker crane 3a.

In other words, as shown in FIG. 3, the sum (L1+L2) of a dimension L1 at which the vertically movable body 10 provided in the first stacker crane 3a protrudes in the lateral direction of the path 2 with respect to the surface S1 of the vertical guide 11 and a dimension L2 at which the vertically movable body 10 provided in the second stacker crane 3b protrudes in the lateral direction of the path 2 with respect to the surface S2 of the vertical guide 11 is greater than the set distance d between the surface S1 of the vertical guide 11 of the first stacker crane 3a and the surface S2 of the vertical guide 11 of the second stacker crane 3b. In the present embodiment, L1 and L2 are equal, but L1 and L2 may differ. Each of the stated dimensions L1 and L2 is less than the set distance d.

Therefore, in the article transfer orientation, where the vertically movable bodies 10 are supported by the vertical guides 11, the vertically movable bodies 10 can be moved past each other by positioning them at different positions in the vertical direction so as to prevent them from interfering with each other.

In this manner, the first stacker crane 3a and the second stacker crane 3b are configured so that the vertically movable bodies 10 provided therein can be moved past each other by positioning the vertically movable bodies 10 at different positions in the vertical direction so as to prevent them from interfering with each other, as shown in FIGS. 3 and 5. The vertically movable bodies 10 provided in the first stacker crane 3a and the second stacker crane 3b can also move past each other in the article transfer orientation supported by the vertical guides 11 by positioning the vertically movable bodies 10 at different positions in the vertical direction so as to prevent them from interfering with each other. Therefore, as shown, for example, in FIGS. 3 and 5, even if the first stacker crane 3a is transferring an article B to/from a storage unit 6 on the side opposite to the side in which the vertically movable body 10 protrudes in the lateral direction of the path 2, the first stacker crane 3a and the second stacker crane 3b can move past each other by positioning the vertically movable body 10 of the second stacker crane 3a and the vertically movable body 10 of the first stacker crane 3a at different positions in the vertical direction so as to prevent them from interfering with each other.

Next, the transit bodies 12, vertical guides 11, and vertically movable bodies 10 will be described with respect to the first stacker crane 3a and second stacker crane 3b, respectively. The first stacker crane 3a and the second stacker crane 3b are configured so as to be symmetrical in the lateral direction of the path 2, so that the disposal positions of the vertical guides 11 and the transit bodies 12, the direction in which the vertically movable bodies 10 protrudes, and so on are on opposite sides of the lateral direction of the path 2. Accordingly, descriptions of the second stacker crane 3b will be omitted, and the first stacker crane 3a only will be described based on FIGS. 6 to 11.

Figure 6:
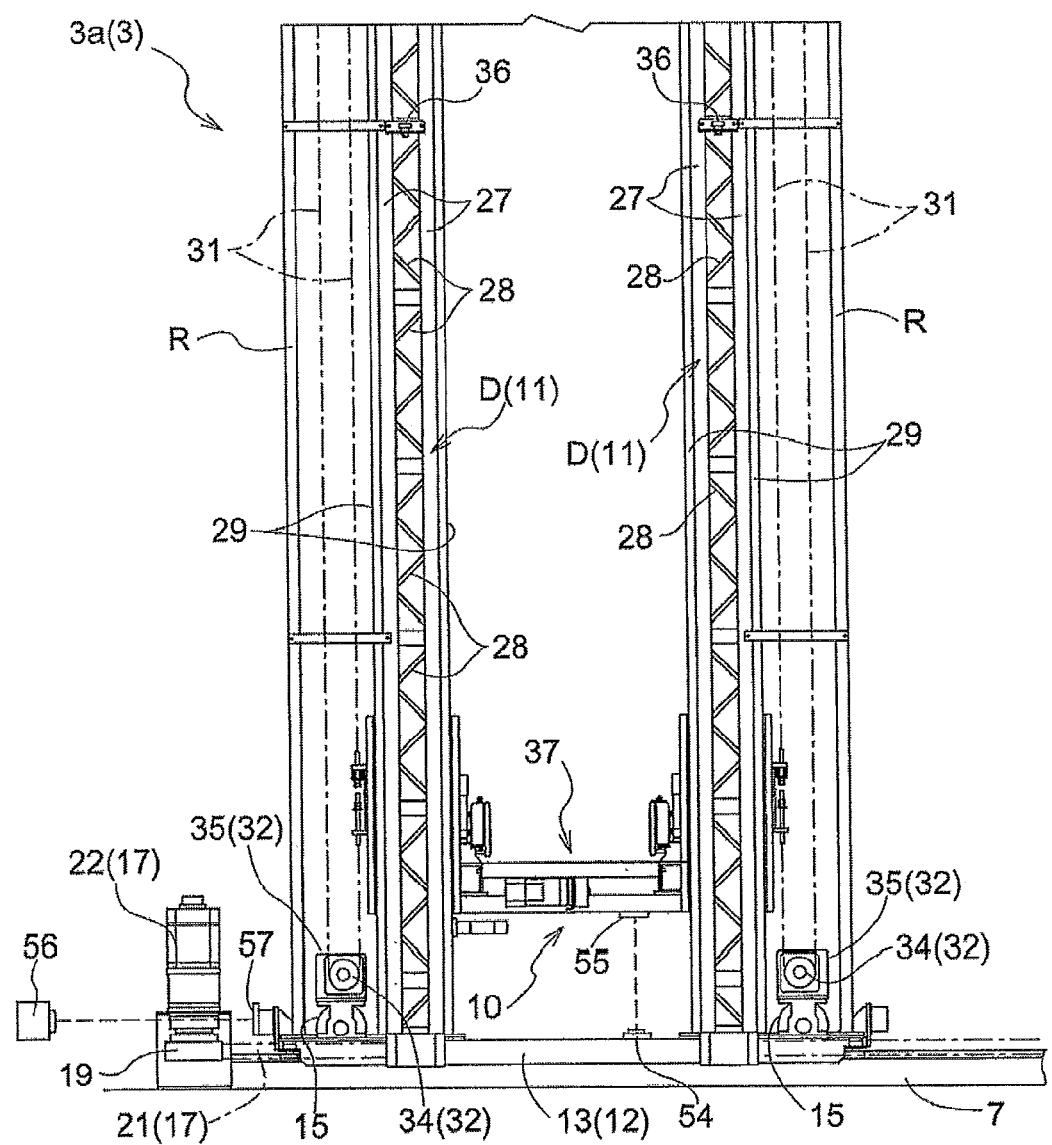
FIG. 6 is a diagram illustrating the first stacker crane in the lateral direction of the path.
Figure 7:
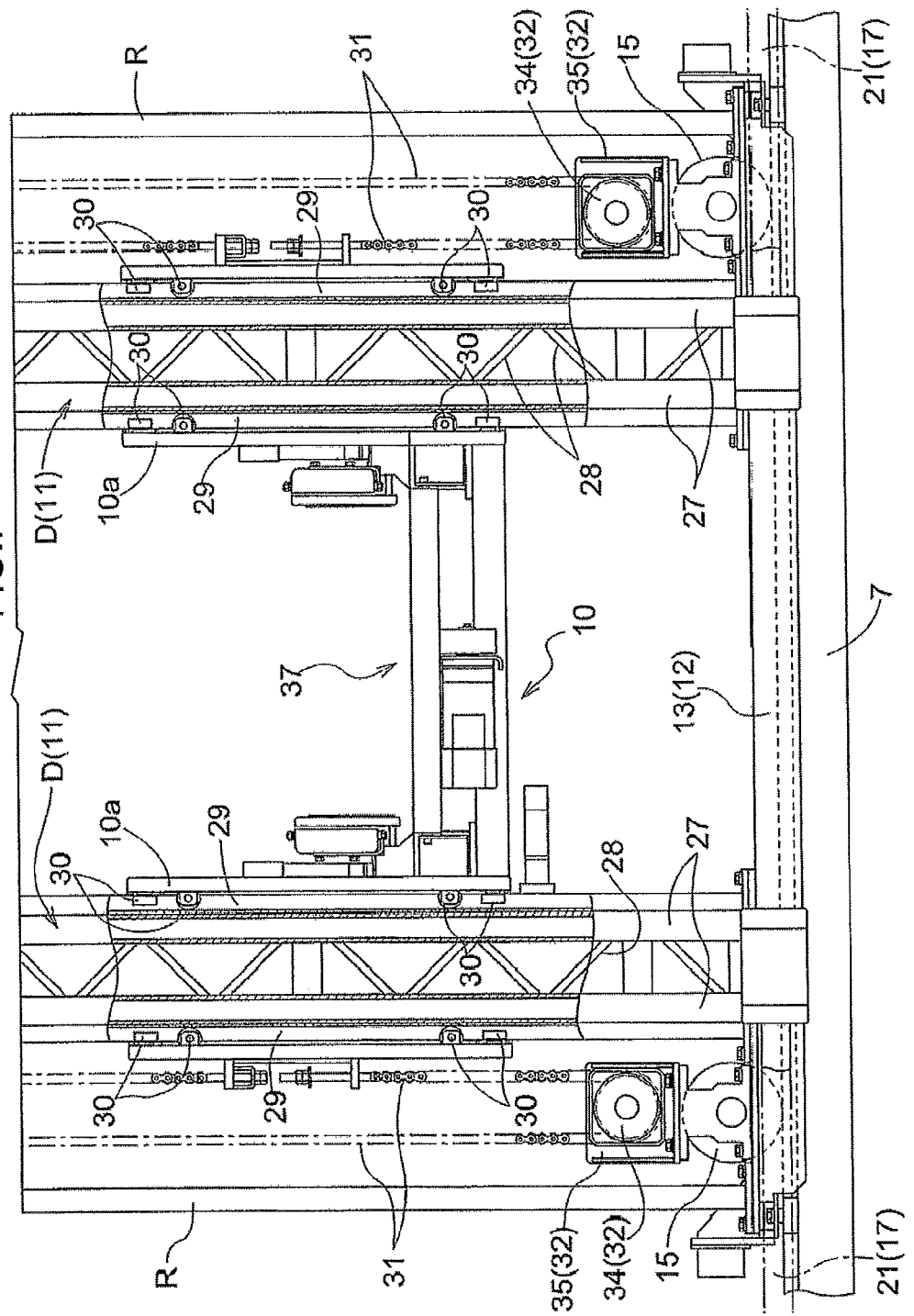
FIG. 7 is a diagram showing an enlarged view of essential elements of the first stacker crane in the lateral direction of the path.

As shown in FIGS. 6 to 8, the transit bodies 12 each include a lower moving portion 13 guided by the lower guide rail 7 and an upper moving portion 14 guided by the upper guide rail 8, the two portions being driven in synchronization. The lower moving portion 13 and the upper moving portion 14 are formed in a long, slender shape, longer in the lengthwise direction of the path 2 when viewed from a plan view. The lower moving portion 13 and the upper moving portion 14 are linked by a linking member R at both ends in the lengthwise direction of the path 2. Lower transit wheels 15, which make contact with the upper surface of the lower guide rail 7 and rotate, are provided at the front and back of the lower moving portion 13. Meanwhile, left and right upper transit wheels 16, which sandwich the upper guide rail 8 in the horizontal direction and thus make contact with the side surfaces of the upper guide rail 8 and rotate, are provided at the front and back of the upper moving portion 14.

A lower driving portion 17 that drives the lower moving portion 13 and an upper driving portion 18 that drives the upper moving portion 14 are provided above the respective ground surfaces. The lower driving portion 17 includes an endless lower transit driving belt 21 wrapped around and spanning across a lower driving pulley 19 disposed at one end of the lengthwise direction of the path 2 and a lower slave pulley 20 disposed at the other end of the lengthwise direction of the path 2 (see FIG. 4), and a lower driving motor 22 that rotationally drives the lower driving pulley 19. The lower transit driving belt 21 is disposed so as to rotate central to a vertical axis and extend across the entirety of the lengthwise direction of the path 2. The lower moving portion 13 is linked to the lower transit driving belt 21 so as to move along the lengthwise direction of the path 2 due to the rotation of the lower transit driving belt 21. The lower driving portion 17 is configured so that the lower moving portion 13 is caused to make round-trip transits in the lengthwise direction of the path 2, as a result of the lower transit driving belt 21 rotating due to the rotational drive of the lower driving pulley 19 by the lower driving motor 22.

The upper driving portion 18 is configured in the same manner as the lower driving portion 17. In other words, the upper driving portion 18 includes an upper driving pulley 23 corresponding to the lower driving pulley 19, an upper slave pulley 24 corresponding to the lower slave pulley 20, an upper transit driving belt 25 corresponding to the lower transit driving belt 21 (see FIG. 4), and an upper driving motor 26 corresponding to the lower driving motor 22. The upper moving portion 14 is linked to the upper transit driving belt 25 so as to move along the lengthwise direction of the path 2 due to the rotation of the upper transit driving belt 25. The upper driving portion 18 is configured so that the upper moving portion 14 is caused to make round-trip transits in the lengthwise direction of the path 2, as a result of the upper transit driving belt 25 rotating due to the rotational drive of the upper driving pulley 23 by the upper driving motor 26.

By simultaneously driving the lower driving motor 22 of the lower driving portion 17 and the upper driving motor 26 of the upper driving portion 18, the lower moving portion 13 and the upper moving portion 14 are driven in synchronization. In this manner, the transit body 12 can be transited while reducing wobbling in the vertical guide 11, which reduces wobbling of the vertically movable body 10 during the transit of the transit body 12, thereby preventing, for example, articles B from falling off of the vertically movable body 10. A transit ranging device 56 that detects the transit position of the transit body 12 in the lengthwise direction of the path 2 is provided. The transit ranging device 56 is configured to emit, along the lengthwise direction of the path 2, a beam of light for measuring distance toward a transit reflective member 57 provided on the lower moving portion 13, and receive the light reflected from the transit reflective member 57, thereby detecting the distance to the transit reflective member 57 and detecting the transit position of the transit body.

The vertical guide 11 is, as shown in FIGS. 6 to 9, provided between the lower moving portion 13 and the upper moving portion 14 so as to be supported by the lower moving portion 13 and the upper moving portion 14. The vertical guide 11 is configured so as to include a pair of vertical guide portions D, arranged in the lengthwise direction of the path 2. Each of the pair of vertical guide portions D are configured by connecting a pair of support columns 27 aligned in the lengthwise direction of the path 2 with angled auxiliary support columns 28 in a lattice form. Each support column 27 is formed in a rectangular shape in a plan view, and the angled auxiliary support columns 28 are aligned between the two support columns 27 in the lengthwise direction of the path 2.

In this manner, the vertical guide portions D are configured by connecting the pair of support columns 27 aligned in the lengthwise direction of the path 2 using the lattice 28, and thus a narrower profile in the lateral direction of the path 2 can be realized, making the lateral direction of the path 2 compact.

Because the vertical guide portions D have narrower profiles in the lateral direction of the path 2, there is a chance that the vertical guide portions D may wobble in the lateral direction of the path 2. Accordingly, each of the pair of vertical guide portions D is provided with an intermediate guide roller 36 that makes contact with and is guided by a beam 5 of the storage rack 1 at a central portion in the vertical direction, which reduces wobbling in the lateral direction of the path 2.

Figure 9:
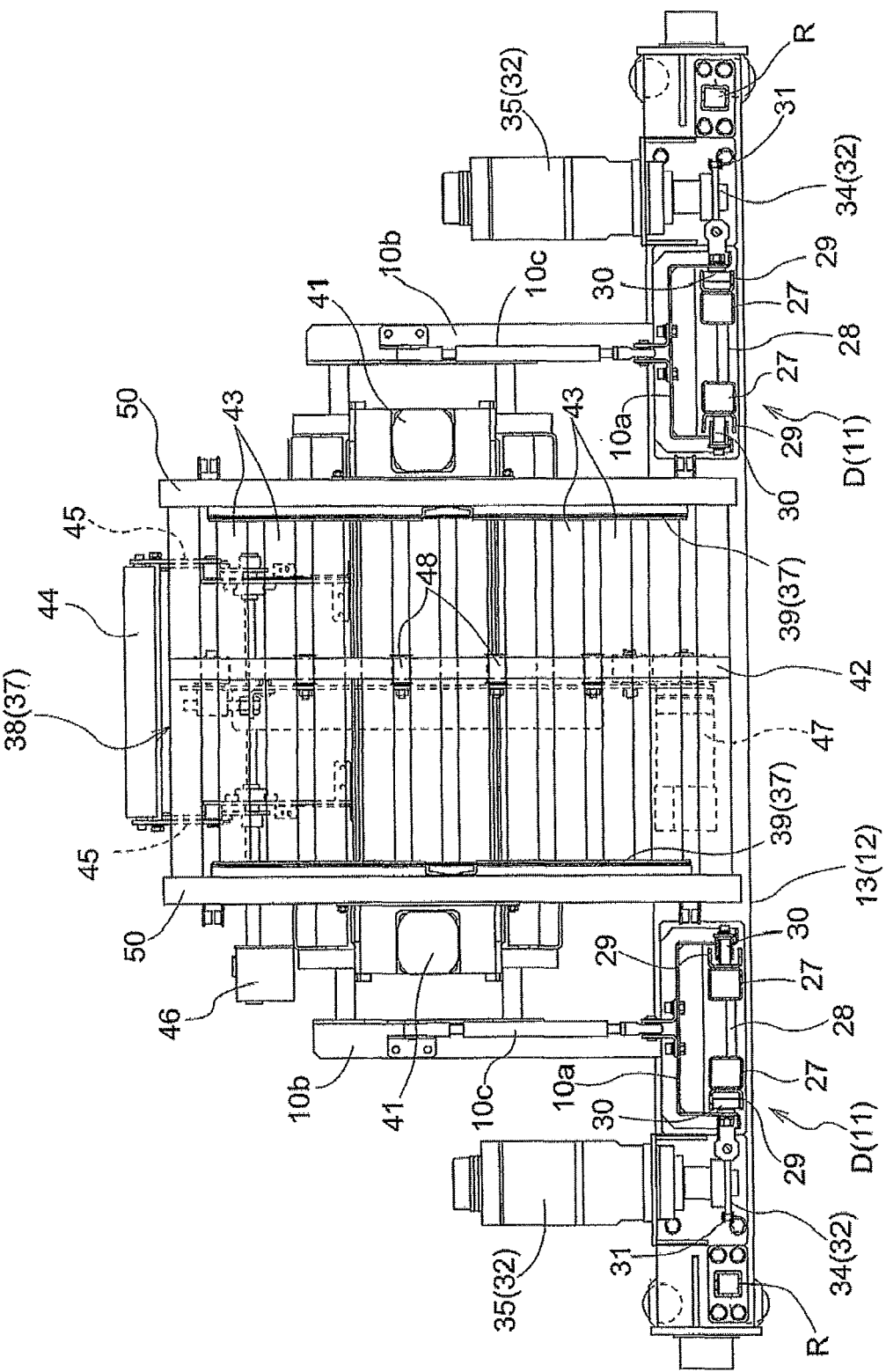
FIG. 9 is a plan view of the first stacker crane.

The vertically movable body 10 is, as shown in FIGS. 8 and 9, provided such that it is positioned between the two vertical guide portions D and is guided by the vertical guide portions D such that it is allowed to be moved vertically. The vertically movable body 10 is configured of a pair of elevator frames 10a that are supported by the pair of vertical guide portions D so as to rise and drop, a horizontal frame 10b that extends in the horizontal direction, linking the two elevator frames 10a to each other, and bar-shaped linking frames 10c that link the elevator frames 10a to the horizontal frame 10b.

The elevator frames 10a of the vertically movable body 10 are provided with elevator guide rollers 30 that are guided by elevator guide rails 29 provided in each of the pair of support columns 27. The elevator guide rails 29 are formed in a bracket shape when viewed from a plan view, and are provided on the side surfaces of the support columns 27 on the side opposite to the lattices 28 in the lengthwise direction of the path 2. There are two types of elevator guide rollers 30: those that limit the movement of the vertically movable body 10 in the lengthwise direction of the path 2, and those that limit the movement of the vertically movable body 10 in the lateral direction of the path 2. These two types of elevator guide rollers 30 are disposed at intervals in the vertical direction.

As shown in FIGS. 6 and 7, a pair of elevator driving portions 32 are provided corresponding to each of the pair of vertical guide portions D, each elevator driving portion taking up and letting out an elevator chain 31, which is a cordlike member that supports the vertically movable body 10 in a hanging manner so that the vertically movable body 10 can rise/drop. The elevator driving portions 32 corresponds to a cordlike driving portion.

The elevator chain 31 is connected at one end to the vertically movable body 10, and is wound upon a guide sprocket 33 provided in the upper moving portion 14, after which the elevator chain 31 is wound upon a driving drum 34 provided in the lower moving portion 13, and the other end of the elevator chain 31 is connected to the vertically movable body 10. Each elevator driving portion 32 is composed of the driving drum 34 and an elevator motor 35, and is configured so that the elevator chain 31 is taken up or let out by rotationally driving the driving drum 34 using the elevator motor 35.

The configuration is such that the horizontal positioning of the vertically movable body 10 is maintained during the raising/dropping thereof by driving the elevator driving portions 32 in synchronization.

An elevation ranging device 54 that detects the position of the vertically movable body 10 in the vertical direction is provided in the lower moving portion 13. The elevation ranging device 54 is configured to emit, along the direction of elevation of the vertically movable body 10, a beam of light for measuring distance toward an elevation reflective member 55 provided in the vertically movable body 10, and receive the light reflected from the elevation reflective member 55, thereby detecting the distance to the vertically movable body 10 and detecting the vertical position of the vertically movable body 10.

Figure 10:
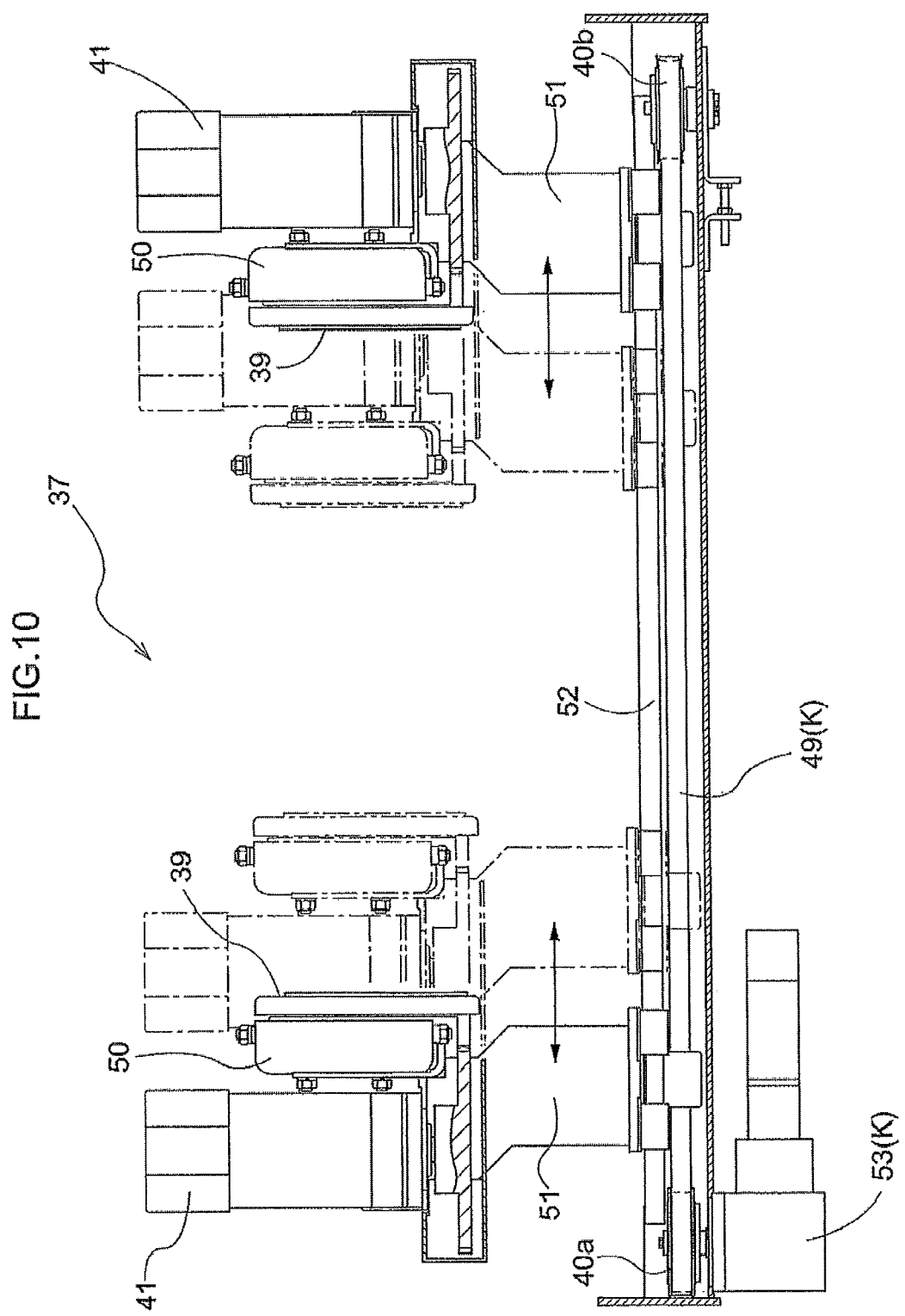
FIG. 10 is a diagram showing an enlarged view of essential elements of an article transfer device in a transfer direction.

As shown in FIGS. 8 to 10, an article transfer device 37 that transfers articles B between a storage unit 6 and the storage/retrieval portion 9 is provided in the vertically movable body 10. The article transfer device 37 is supported by the horizontal frame 10b of the vertically movable body 10. The article transfer device 37 is configured so as to transfer articles B between storage units 6 positioned on both sides in the lateral direction of the path and the storage/retrieval portion 9. The article transfer device 37 includes a conveyor 38 that transports articles B in the lateral direction of the path 2, which serves as the transfer direction, where the articles B are mounted on and supported by the conveyor 38, and a pair of fork members 39 capable of moving toward and away from each other in the direction orthogonal to the transfer direction and that can extend and retract between a retracted position, retracted relative to the conveyor 38, and an extended position, protruding in the outward direction. The article transfer device 37 is provided with a holding state switching mechanism K capable of switching the pair of fork members 39 between a holding state in which the fork members 39 are moved toward each other so as to hold the article B from both sides and a release state in which the fork members 39 are moved away from each other so as to release their hold on the article B, and a extending/retracting driving motor 41 that extends and retracts the pair of fork members 39 between the retracted position and the extended position.

Figure 11:
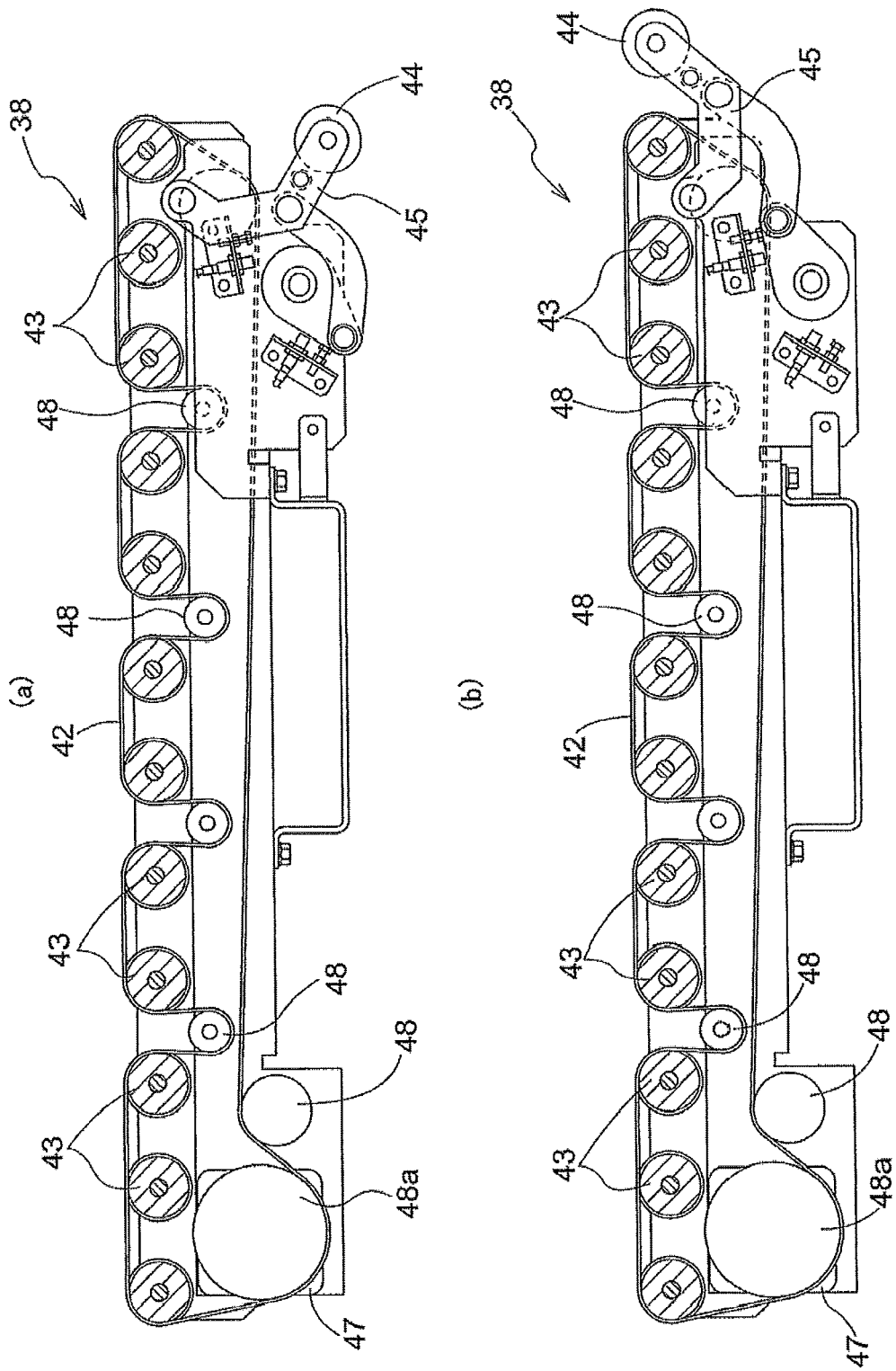
FIG. 11 is a diagram showing specifics of a conveyor in the article transfer device.

As shown in FIGS. 9 and 11, the conveyor 38 is configured as a roller conveyor, in which a plurality of rollers 43 are arranged in the transfer direction. An endless conveyor transmission belt 42 is disposed so as to be wrapped around the plurality of rollers 43 and a plurality of conveyor pulleys 48, and spans the entire length of the transfer direction. One of the plural conveyor pulleys 48 is a driving conveyor pulley 48a that is rotationally driven by a conveyor motor 47; the conveyor transmission belt 42 is rotated by the rotational drive of the driving conveyor pulley 48a. The conveyor 37 is configured so that each roller 43 is rotationally driven by the conveyor transmission belt 42 being rotated through the conveyor motor 47 rotationally driving the driving conveyor pulleys 48a, and the articles B are mounted and transported thereby.

When the first stacker crane 3a and the second stacker crane 3b move past each other (see FIGS. 3 and 5), the vertically movable body 10 and the vertical guide 11 of the opposing article transport 3 pass each other, on the side in which the vertically movable body 10 protrudes in the lateral direction of the path 2. Therefore, because there is a space between the end of the conveyor 38 and the storage unit 6 or the storage/retrieval portions 9 on the side in which the vertically movable body 10 protrudes in the lateral direction of the path 2, there is a chance that the article B cannot be properly mounted/transported by the conveyor 38 when the article B is transferred between the storage unit 6 or the storage/retrieval portions 9.

Accordingly, a support roller 44 that can change positions between a transport position for mounting/transporting articles B in line along the direction horizontal to the rollers 43 (see FIG. 11B) and a retracted position that retracts to the underside of the rollers 43 (see FIG. 11A) is provided at the end of the conveyor 38 on the side in which the vertically movable body 10 protrudes in the lateral direction of the path 2. The support roller 44 is supported by a swinging arm 45 so as to be able to swing central to an axis along the lengthwise direction of the path 2. A support roller motor 46 is configured so as to switch the position of the support roller 44 between the transport position and the retracted position by causing the swinging arm 45 to swing. Therefore, the support roller 44 is normally placed in the retracted position, and its position is switched to the transport position only when articles B are transferred between a storage unit 6 or the storage/retrieval portions 9 provided on the side in which the conveyor 38 protrudes.

The pair of fork members 39 are, as shown in FIGS. 9 and 10, formed as plates that oppose each other and whose inner surfaces grasp the side surfaces of the articles B, and are supported by a pair of mobile members 50, each of which is disposed on the right and left side, respectively, relative to the transfer direction, and which can extend and retract in the transfer direction. Each of the mobile members 50 is supported by a support platform 51, which are disposed on the right and left sides, respectively, relative to the transfer direction. The support platforms 51 are provided on a guide rail 52 disposed along the direction orthogonal to the transfer direction in the central portion of the transfer direction, so as to be slidable.

The holding state switching mechanism K includes, as shown in FIG. 10, an opening/closing motor 53 that switches the pair of fork members 39 between a holding state and a release state by causing the fork members 39 to move toward and away from each other, and an endless opening/closing belt 49 wound upon and spanning across a driving pulley 40a and a slave pulley 40b. The driving pulley 40a is provided so as to be rotationally driven by the opening/closing motor 53, and portions partway along the opening/closing belt 49 are respectively linked to each of the support platforms 51.

By causing the opening/closing belt 49 to rotate through rotationally driving the driving pulley 40a using the opening/closing motor 53, the holding state switching mechanism K causes the pair of support platforms 51 to move closer to and away from each other in which they are guided by the guide rail 52. The holding state switching mechanism K causes the pair of fork members 39 and the pair of mobile members 50 to move toward and away from each other in a unified manner in accordance with the movement of the pair of support platforms 51, thereby switching the pair of fork members 39 between the holding state and the release state.

A pair of extending/retracting driving motors 41 are provided, one corresponding to each of the pair of fork members 39. The pair of extending/retracting driving motors 41 drive in synchronization, and are therefore configured so as to drive the pair of fork members 39 in synchronization in an extending operation, which extends the fork members 39 from a retracted position (see FIG. 12A) to an extended position (see FIG. 12B), or in a retracting operation, which retracts the fork members 39 from the extended position to the retracted position.

Figure 13:
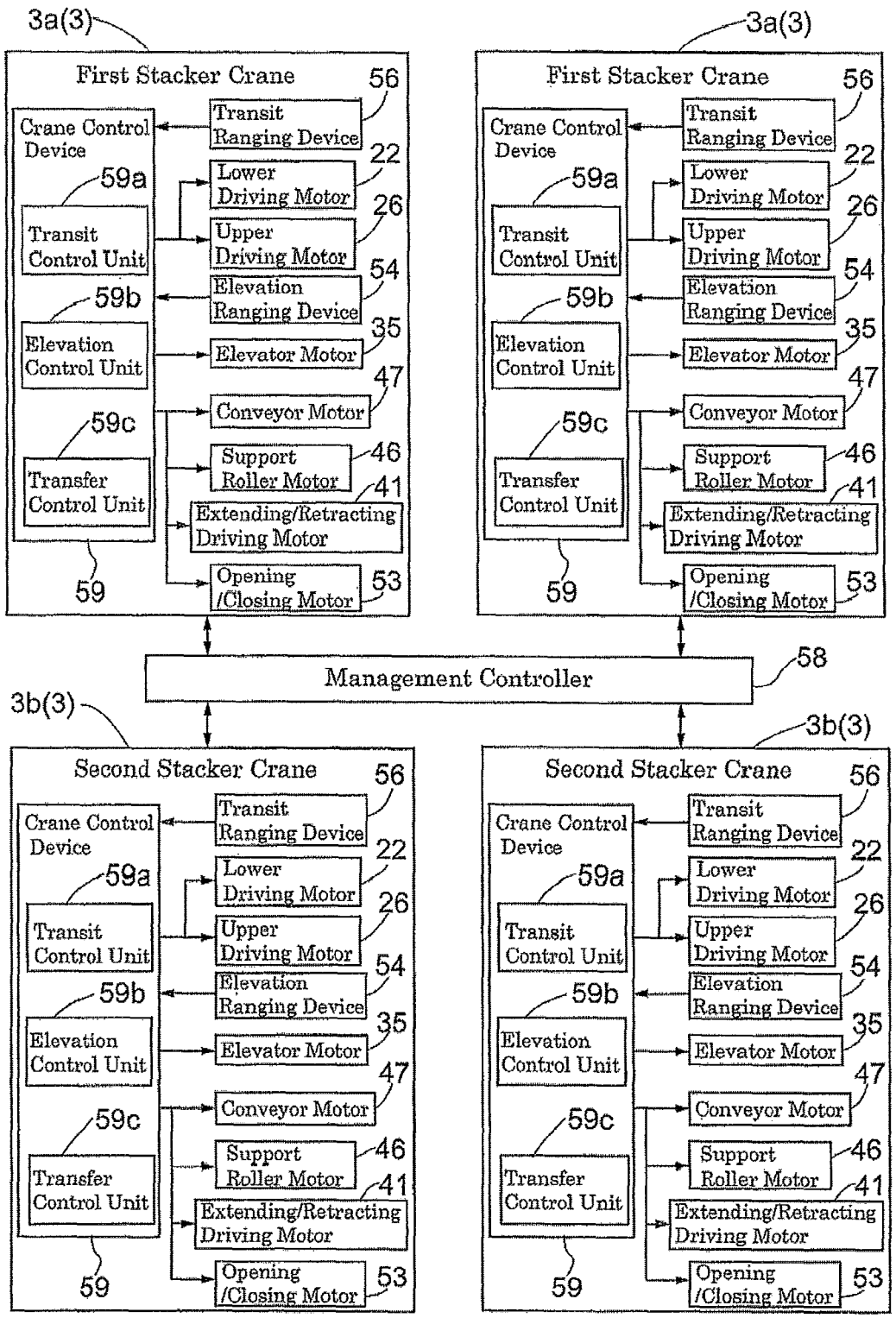
FIG. 13 is a control block diagram of the article storage facility.

As illustrated in FIG. 13, crane control devices 59 are provided for each of the stacker cranes 3, and control the operations of each stacker crane 3 so as to perform an article transport operation for transporting articles B in accordance with commands from a management controller 58. The control devices, control units, control means, and so on used in the present specification are conventional technologies, and thus detailed descriptions thereof will not be given. In addition to the necessary hardware such as CPUs, memories, communication devices, and so on, the control devices, control units, and control means include algorithms in the form of software stored inside the memories. In the article transport operation, the crane control device 59 controls the transit operations of the transit body 12 and the elevation operations of the vertically movable body 10 so as to move the article transfer device 37 into an article transfer stopped position relative to the storage unit 6 or the storage/retrieval portion 9, and controls the transfer operation of the article transfer device 37 so as to extract an article B that is supported by the storage unit 6 or the storage/retrieval portion 9 or to pass an article B to the storage unit 6 or the storage/retrieval portion 9 in a state where the article transfer device 37 is stopped in the article transfer stopped position.

Each crane control device 59 is configured of: a transit control unit 59a that controls the transit operation of the transit body 12 so as to move the article transfer device 37 into the article transfer stopped position in the horizontal direction based on information detected by the transit ranging device 56; an elevation control unit 59b that controls the elevation operation of the vertically movable body 10 so as to move the article transfer device 37 into the article transfer stopped position in the vertical direction based on information detected by the elevation ranging device 54; and a transfer control unit 59c that controls the transfer operation of the article transfer device 37 so as to extract an article B supported by the storage unit 6 or the storage/retrieval portion 9 or pass an article B to the storage unit 6 or the storage/retrieval portion 9.

The transit control unit 59a drives the lower driving motor 22 and the upper driving motor 26 in synchronization, thereby driving the lower moving portion 13 and the upper moving portion 14 in synchronization and causing the transit body 12 to perform transit operations. While the transit body 12 is in transit, the transit control unit 59a monitors the position of the article transfer device 37 in the horizontal direction based on the information detected by the transit ranging device 56. When the article transfer device 37 reaches the article transfer stopped position in the horizontal direction, the transit control unit 59a stops driving the lower driving motor 22 and the upper driving motor 26 and stops the transit of the transit body 12, thereby positioning the article transfer device 37 in the article transfer stopped position in the horizontal direction.

The elevation control unit 59b causes the vertically movable body 10 to perform elevator operations by driving the pair of elevator motors 35 in synchronization. While the vertically movable body 10 is elevating/descending, the elevation control unit 59b monitors the position of the article transfer device 37 in the vertical direction based on information detected by the elevation ranging device 54. When the article transfer device 37 reaches the article transfer stopped position in the vertical direction, the elevation control unit 59b stops driving the pair of elevator motors 35 and stops the vertical movement of the vertically movable body 10, thereby positioning the article transfer device 37 in the article transfer stopped position in the vertical direction.

Figure 12:
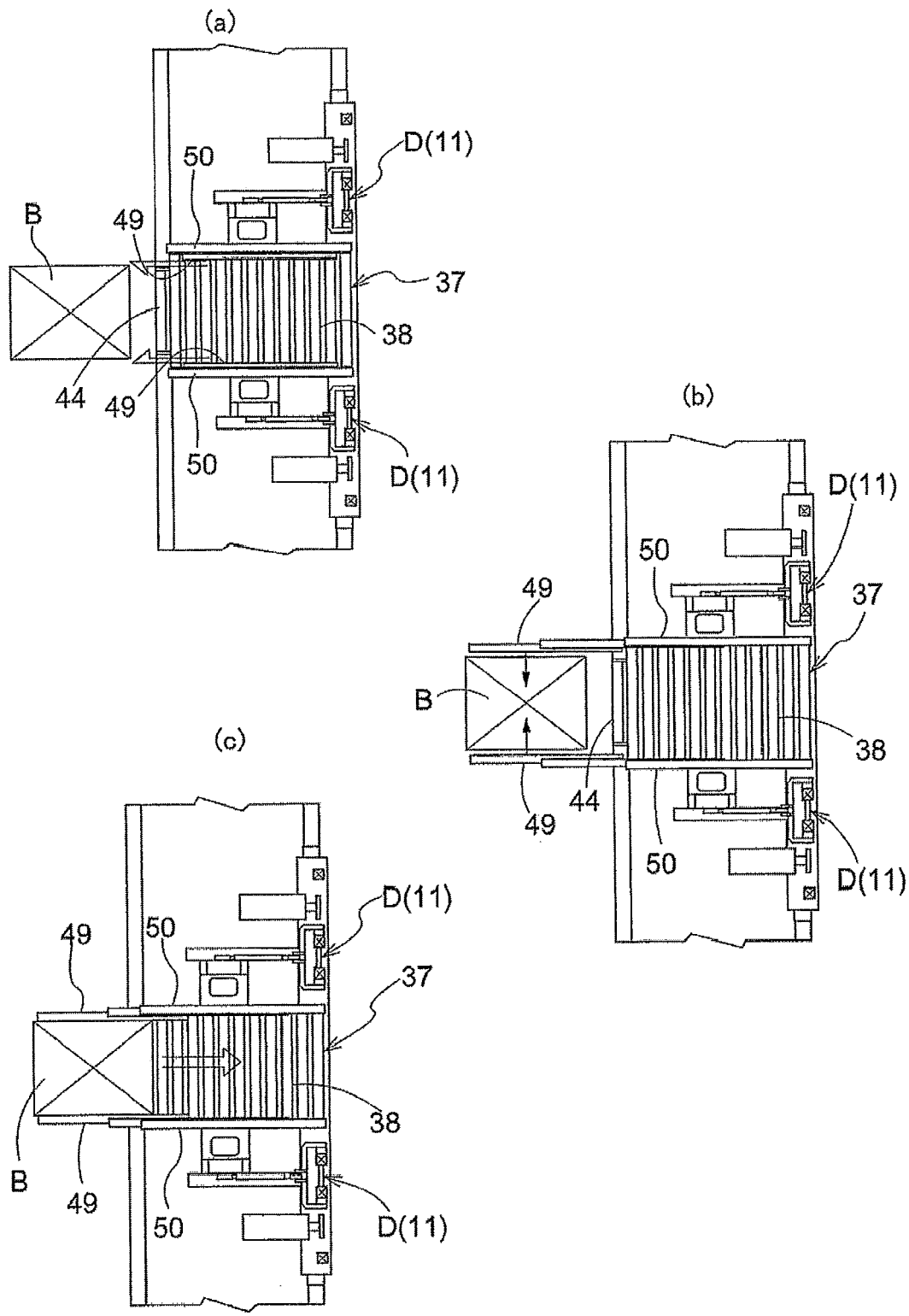
FIG. 12 is a plan view illustrating the transfer of articles with respect to a storage unit.

Descriptions will be provided regarding the operations of the transfer control unit 59c, but first, the case where an article B is extracted from the storage unit 6 or the storage/retrieval portion 9 will be described. As shown in FIGS. 12A and 12B, the transfer control unit 59c controls the extending/retracting driving motors 41 and the opening/closing motor 53 so that the pair of fork members 39 is extended from the retracted position into the extended position while maintaining the release state, after which the pair of fork members 39 is caused to close, switching them from the release state into the holding state. Then, as shown in FIG. 12C, the transfer control unit 59c controls the operation of the extending/retracting driving motors 41 so that the pair of fork members 39 is retracted from the extended position to the retracted position in a state in which the pair of fork members 39 holds the article B in the holding state, and also controls the operation of the conveyor motor 47 to transport the article B by pulling the article B back toward the side of the vertically movable body 10 using the conveyor 38. In this manner, the article B is extracted from the storage unit 6 or the storage/retrieval portion 9 to the article transfer device 37.

Next, descriptions will be provided regarding the case where an article B is passed to the storage unit 6 or the storage/retrieval portion 9; the operations performed here are basically the reverse of the case where an article B is extracted from the storage unit 6 or the storage/retrieval portion 9.

The transfer control unit 59c controls the operation of the extending/retracting driving motors 41 so that the pair of fork members 39 is extended from the retracted position to the extended position in a state in which the pair of fork members 39 holds the article B in the holding state, and also controls the operation of the conveyor motor 47 to transport the article B by pushing the article B forward toward the side of the storage unit 6 or the storage/retrieval portion 9 using the conveyor 38. In this manner, when passing an article B to the storage unit 6 or the storage/retrieval portion 9, the transfer control unit 59c controls the operation of the opening/closing motor 53 to close the pair of fork members 39, thereby switching from the release state to the holding state, and then controls the operation of the extending/retracting driving motors 41 so as to retract the pair of fork members 39 from the extended position to the retracted position.

When the storage unit 6 or the storage/retrieval portion 9 provided on the side in which the vertically movable body 10 protrudes in the lateral direction of the path 2 are the target of the transfer, the transfer control unit 59c controls the operation of the support roller motor 46 so as to switch the position of the support roller 44 from a retracted position to a transport position, as shown in FIGS. 12A to 12C. When the transfer of the article B to/from the storage unit 6 or the storage/retrieval portion 9 is complete, the transfer control unit 59c controls the operation of the support roller motor 46 so as to switch the position of the support roller 44 from the transport position to the retracted position.

The management controller 58 is configured so as to control the operation of the first stacker crane 3a and the second stacker crane 3b by providing commands to the respective crane control devices 59 of the first stacker crane 3a and the second stacker crane 3b. The control means that controls the operation of the first stacker crane 3a and the second stacker crane 3b is configured of the management controller 58 and the crane control devices 59 of the respective stacker cranes 3.

The management controller 58 is configured so as to provide, for example, movement commands to the crane control devices 59, such as a storage command for storing an article B from the storage/retrieval portion 9 into one of the plural storage units 6, a removal command for removing an article B stored in one of the plural storage units 6 to the storage/retrieval portion 9, and the like. The management controller 58 is also configured to provide a command for a transfer stopped position corresponding to the storage unit 6 or storage/retrieval portion 9 that are targets of the transfer at this time.

The management controller 58 is configured so as to cause the stacker cranes 3 to separately transport articles by providing commands separately to the crane control devices 59 of the stacker cranes 3. In other words, upon receiving a movement request such as a storage request for storing an article B from the storage/retrieval portion 9 into one of the plural storage units 6, a removal request for removing an article B stored in one of the plural storage units 6 to the storage/retrieval portion 9, or the like, the management controller 58 selects a stacker crane 3 to cause to transport an article from among the plural stacker cranes 3, and provides a command to the crane control device 59 so that the selected stacker crane 3 transports the article.

When causing the stacker cranes 3 to separately transport articles, in the case where the movement ranges of the first stacker cranes 3*a* or second stacker cranes 3*b* will interfere with each other in the path 2, the management controller 58 provides a movement limit command to limit the movement of the stacker cranes 3, thereby preventing the first stacker cranes 3*a* or the second stacker cranes 3*b* from colliding with each other.

For example, when the movement ranges of the first stacker cranes 3*a* will interfere with each other in the path 2, the management controller 58 takes the movement range in the path 2 of the first stacker crane 3*a* that transports an article first as an entry prohibited range, and provides a movement limit command to the crane control device 59 of the first stacker crane 3*a* that transports an article after, so that the first stacker crane 3*a* that transports an article after does not enter the entry prohibited range. Upon receiving the movement limit command, the crane control device 59 controls the operation of the stacker crane 3 so as to stop the stacker crane 3 before the entry prohibited range, move the stacker crane 3 outside of the entry prohibited range, and so on.

When causing the stacker cranes 3 to separately transport articles, in the case where the movement ranges of the first stacker crane 3*a* and the second stacker crane 3*b* will interfere with each other in the path 2, the management controller 58 provides a passing movement command to the crane control devices 59 of the stacker cranes 3 that causes the first stacker crane 3*a* and the second stacker crane 3*b* to move past each other. Upon receiving the passing movement command, the crane control devices 59 control the operation of the stacker cranes 3 so that the first stacker cranes 3*a* and the second stacker cranes 3*b* move past each other while positioned in different positions in the vertical direction, in order to prevent the vertically movable bodies 10 from interfering with each other.

As a passing movement command, for example, the management controller 58 sets a passing position that positions the vertically movable bodies 10 with spaces in between in the vertical direction, and provides that set passing position to the crane control devices 59 as a command. The crane control devices 59 control the operation of the stacker cranes 3 so as to cause the transit bodies 12 to transit after the vertically movable bodies 10 have been elevate/dropped to the passing position, after which the vertically movable bodies 10 are again elevated/dropped, so that the article transfer devices 37 are positioned in the article transfer stopped position.

In addition, in the case where the movement ranges of the first stacker crane 3*a* and second stacker crane 3*b* will interfere with each other in the path 2, the management controller 58 does not always provide a passing movement command, but may provide a movement limit command to limit the movement of the stacker cranes 3. When the stacker crane 3 that transports an article first is transferring an article B to/from a storage unit 6 on the side in which the vertically movable body 10 protrudes in the lateral direction of the path 2, the support roller 44 is positioned in the transport position, and thus the first stacker crane 3*a* and the second stacker crane 3*b* cannot move past each other. Accordingly, in such a time, the movement limit command, which limits the movement of the stacker cranes 3, is provided.

Figure 14:
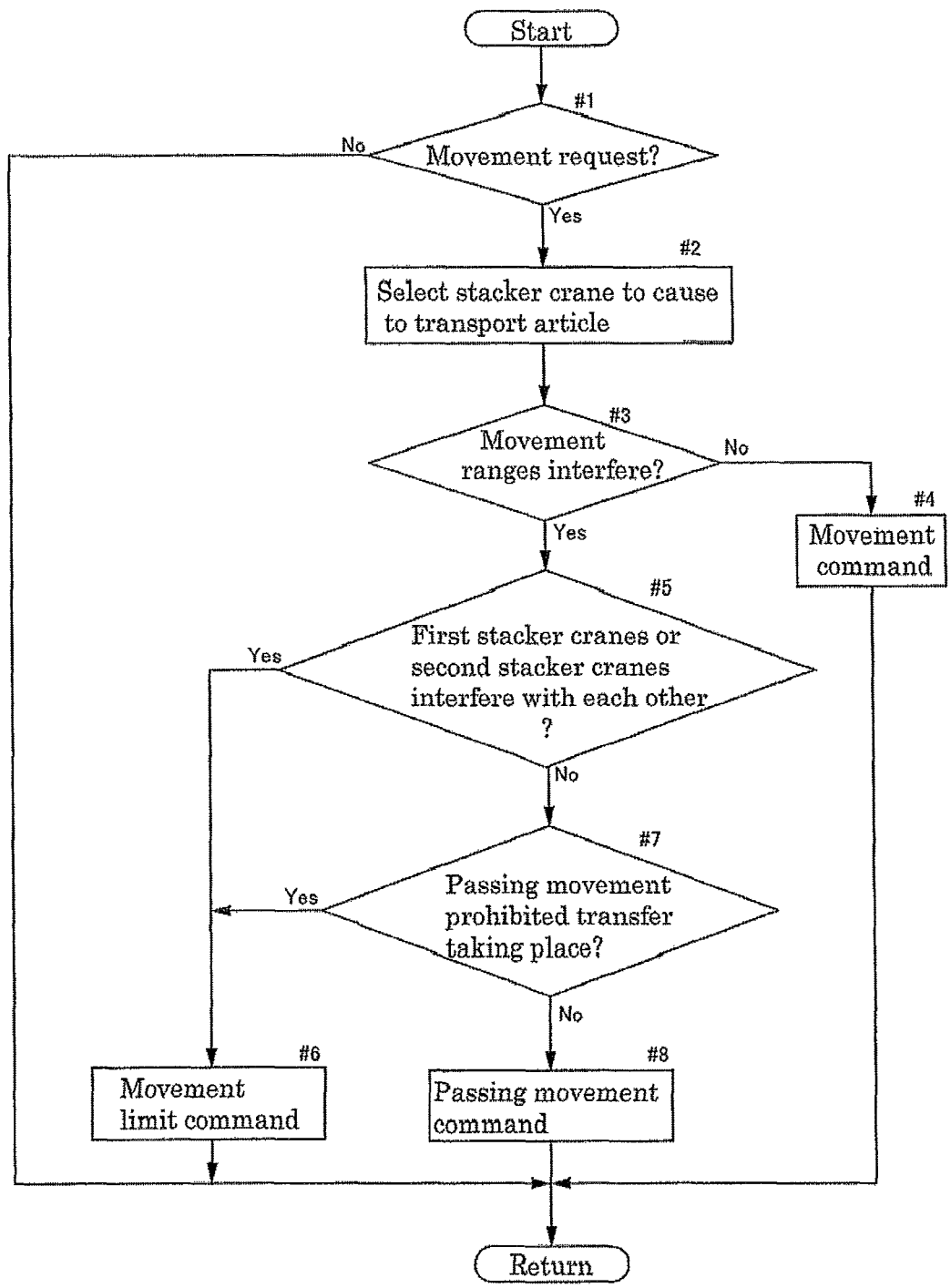
FIG. 14 is a flowchart illustrating control operations performed by a management controller.

The commands provided by the management controller 58 will be described based on the flowchart of FIG. 14.

Upon receiving a movement request, the management controller 58 selects, from among the plural stacker cranes 3, the stacker crane 3 that is to be caused to transport an article (steps 1 and 2). The management controller 58 then determines whether or not the movement range of the stacker crane 3 that transports an article first and the movement range of the selected stacker crane 3 will interfere with each other, and if the movement ranges do not interfere with each other, the management controller 58 provides a movement command to the crane control device 59 of the selected stacker crane 3 (steps 3 and 4).

However, if the movement ranges of the first stacker crane 3*a* and second stacker crane 3*b* will interfere with each other, the management controller 58 provides a movement limit command to the crane control device 59 of the selected stacker crane 3 (steps 5 and 6).

Even if the movement ranges of the first stacker crane 3*a* and the second stacker crane 3*b* interfere with each other, the first stacker crane 3*a* and the second stacker crane 3*b* can move past each other. However, when the stacker crane 3 that transports an article first is transferring an article B to/from a storage unit 6 on the side in which the vertically movable body 10 protrudes in the lateral direction of the path 2, the support roller 44 is positioned in the transport position, and thus acts as an obstruction; therefore, the first stacker crane 3*a* and the second stacker crane 3*b* cannot move past each other. Accordingly, the management controller 58 assumes that when the stacker crane 3 that transports an article first is transferring an article B to/from a storage unit 6 on the side in which the vertically movable body 10 protrudes in the lateral direction of the path 2, a passing movement prohibited transfer is taking place, and if the passing movement prohibited transfer is taking place, the management controller 58 provides a movement limit command to the crane control device 59 of the selected stacker crane 3 (steps 7 and 6).

In the case where the movement ranges of the first stacker crane 3*a* and second stacker crane 3*b* will interfere with each other, and a passing movement prohibited transfer is not taking place, the management controller 58 provides a passing movement command to the crane control device 59 of the selected stacker crane 3 (steps 7 and 8). In this manner, the first stacker crane 3*a* and second stacker crane 3*b* are caused to move past each other and the stacker cranes 3 are caused to transport articles not only when the stacker crane 3 that transports articles first is not transferring an article to/from a storage unit 6, but also when the stacker crane 3 that transports an article first is transferring an article B to/from a storage unit 6 on the side opposite to the side in which the vertically movable body 10 protrudes in the lateral direction of the path 2.

(Second Embodiment)

The second embodiment is a different embodiment of the pair of vertical guide portions D in the vertical guide 11 of the abovementioned first embodiment. Other aspects of the configuration are the same as in the abovementioned first embodiment, and thus descriptions thereof will be omitted.

Figure 15:
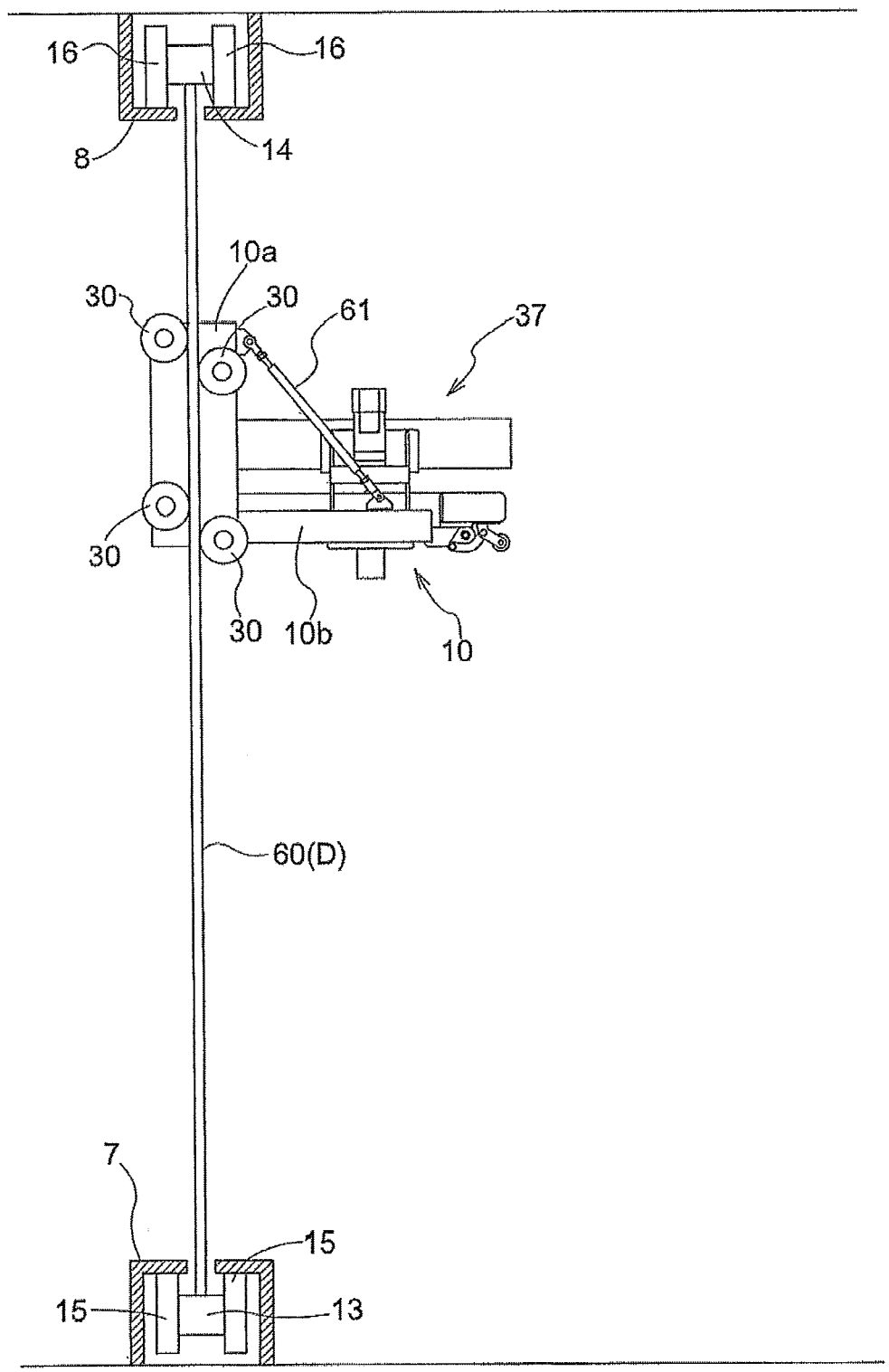
FIG. 15 is a diagram illustrating a stacker crane in the lengthwise direction of the path according to a second embodiment.
Figure 16:
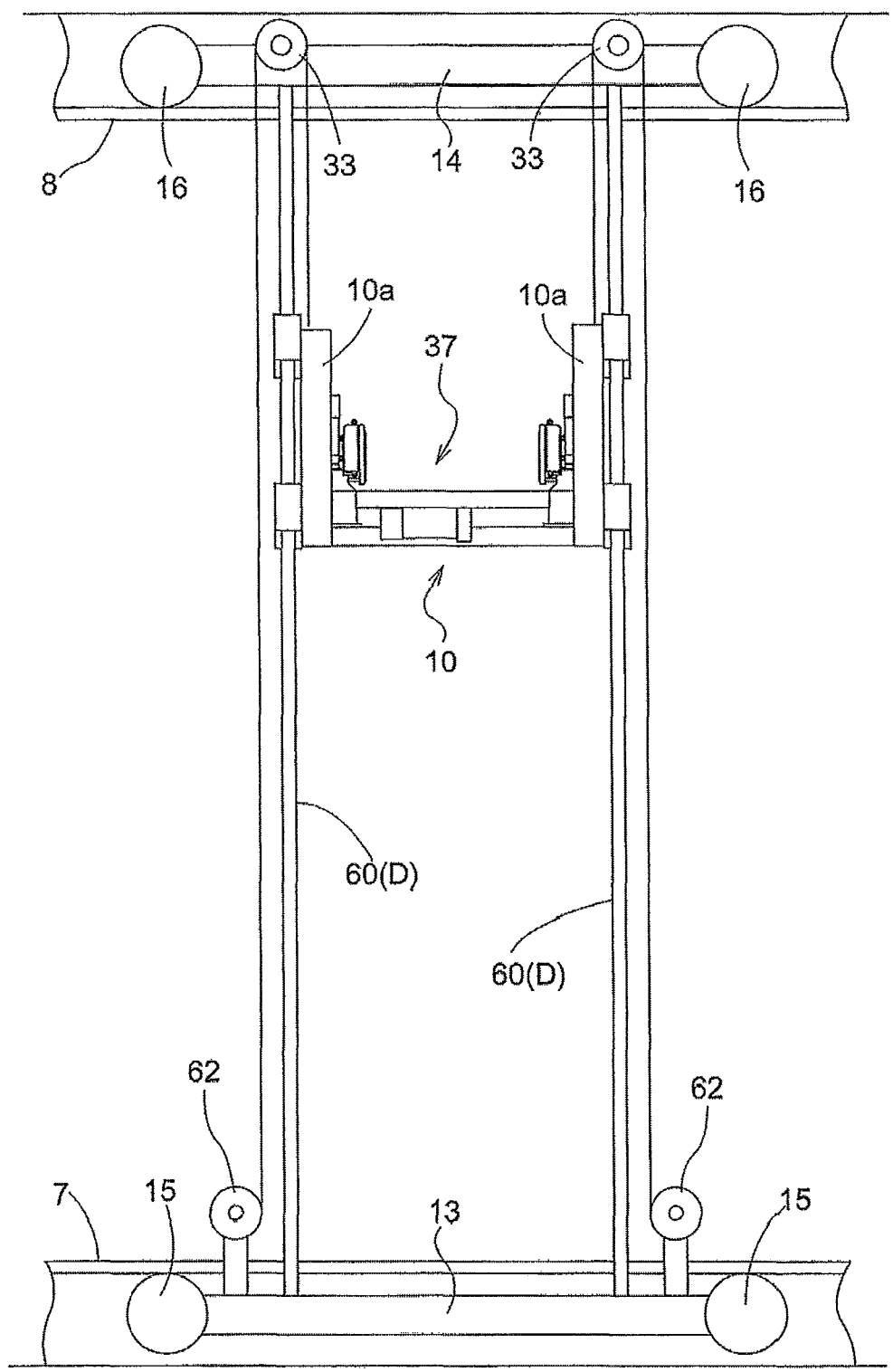
FIG. 16 is a diagram illustrating a stacker crane in the lateral direction of the path according to the second embodiment.

As shown in FIGS. 15 and 16, each of the pair of vertical guide portions D in the vertical guide 11 are configured of wires 60, serving as cordlike members, erected between the upper moving portion 14 and the lower moving portion 13. These wires may instead be ropes, chains, or the like. If the pair of vertical guide portions D are configured using the wires 60 in such a manner, there is a chance that the wires 60 will bend when, for example, articles B are being transferred between the article transfer device 37 and the storage unit 6 or the storage/retrieval portion 9.

Accordingly, the configuration is made such that the lower moving portion 13 hangs down from and is supported by the wires 60, thus applying tension to the wires 60, which in turn reduces the bending of the wires 60. The upper transit wheels 16 of the upper moving portion 14 are provided so that their lower sides make contact with the upper guide rail 8 and rotate, whereas the lower transit wheels 15 of the lower moving portion 13 are provided so that their upper sides make contact with the lower guide rail 7 and rotate.

The elevator chain 31, from which the vertically movable body 10 hangs and is supported so as to elevate/descend, is connected to the vertically movable body 10 at one end and is wound upon a guide sprocket 33 provided in the upper moving portion 14, after which the elevator chain 31 is connected to a take-up drum 62 provided in the lower moving portion 13.

Instead of the linking frame 10c in the abovementioned first embodiment, the vertically movable body 10 is provided with a horizontal maintenance mechanism 61 that maintains the horizontal position of the horizontal frame 10b. The horizontal frame 10b is supported so as to be capable of swinging central to the horizontal axis relative to the elevator frames 10a, and the position of the horizontal frame 10b is held in the horizontal position by the horizontal maintenance mechanism 61. The horizontal maintenance mechanism 61 is configured of, for example, a pneumatic pressure actuator composed of a rubber tube with reinforcement fibers woven into a rhombus shape and a cover that anchors the rubber tube. The horizontal maintenance mechanism 61 causes the rubber tube to constrict by supplying compressed air to the inside of the rubber tube, and by shortening the entire length thereof, the horizontal frame 10b is caused to swing central to the horizontal axis. The horizontal maintenance mechanism 61 is configured so as to hold the horizontal position of the horizontal frame 10b by, for example, controlling the pressure of the compressed air that is supplied to the inside of the rubber tube in accordance with the degree of incline of the horizontal frame 10b.

(Third Embodiment)

The third embodiment is a different embodiment of the vertical guide 11 and the vertically movable body 10 of the abovementioned first embodiment. Other aspects of the configuration are the same as in the abovementioned first embodiment, and thus descriptions thereof will be omitted.

Figure 18:
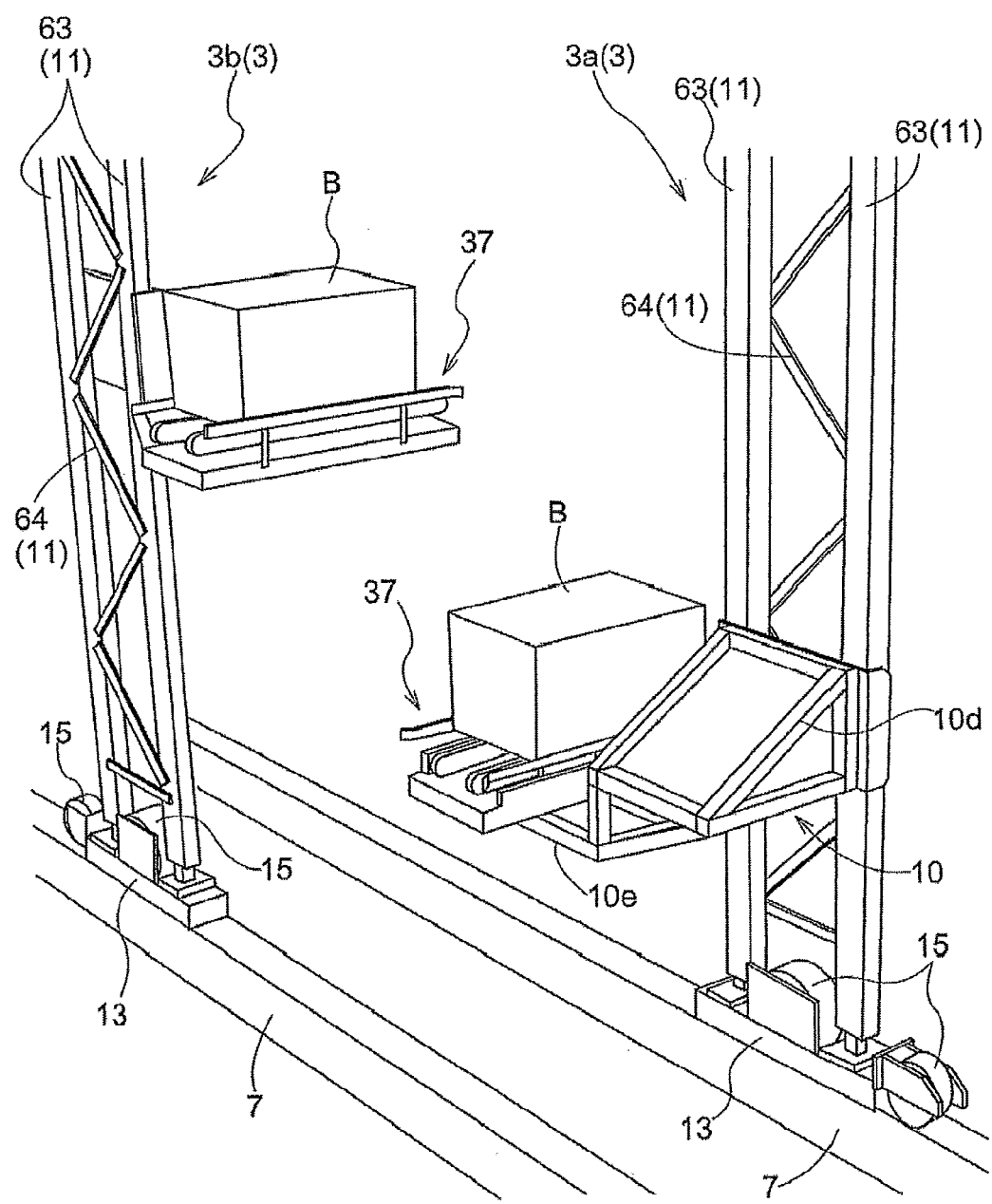
FIG. 18 is a perspective view showing an outline of a first stacker crane and a second stacker crane according to the third embodiment.

As shown in FIGS. 17 and 18, the vertical guide 11 is configured by connecting a pair of support columns 63 arranged in the lengthwise direction of the path 2 using angled auxiliary support columns 64. In other words, the vertical guide 11 has a lattice structure. In this manner, the vertical guide 11 has a thin profile in the lateral direction of the path 2, making the lateral direction of the path 2 compact. Because the vertical guide 11 is configured simply by connecting the pair of support columns 63 arranged in the lengthwise direction of the path 2 using angled auxiliary support columns 64, and thus the length of the lower moving portion 13 and the upper moving portion 14 in the lengthwise direction of the path 2 can be significantly shortened.

The vertically movable body 10 is provided such that it protrudes to one side in the lengthwise direction of the path 2 beyond the pair of support columns 63, and is also provided in a state in which it is guided by the pair of support columns 63 so as to be capable of being moved vertically. The vertically movable body 10 is configured of an elevator frame 10d supported by the pair of support columns 63 to as to be capable of being moved vertically, and an article transfer device support frame body 10e that is connected to the elevator frame 10d and that supports the article transfer device 37 in a position that protrudes to one side beyond the pair of support columns 63 in the lengthwise direction of the path 2. The article transfer device support frame body 10e is formed in an L shape in the lateral direction of the path 2 so as to extend downwards from the elevator frame 10d and then extend in the horizontal direction. The article transfer device 37 is supported by the end portion of the article transfer device support frame body 10e that extends in the horizontal direction.

Two lower transit wheels 15 are provided in the lower moving portion 13, with a space provided therebetween in the lengthwise direction of the path 2. One of the lower transit wheels 15 is disposed in the central portion of the lower moving portion 13, and the other is disposed on the end portion of the lower moving portion 13 on the side opposite the side on which the article transfer device 37 is positioned, relative to the lengthwise direction of the path 2.

The article transfer device 37 is thus positioned in a position offset from the vertical guide 11 in the lengthwise direction of the path 2 and in a position lower than the elevator frame 10a of the vertically movable body 10. As shown in FIG. 17B, the article transfer device 37 can be positioned in a position lower than the lowermost position of the vertical guide 11 when the elevator frames 10a has been lowered to the lowermost position of the vertical guide 11. Therefore, an article B can be transferred to/from a storage unit 6 located in a position lower than the lowermost position of the vertical guide 11, making it possible to provide storage units 6 at lower positions in the vertical direction in the storage rack 1, which leads to an improvement in the storage efficiency.

In the third embodiment, the article B is assumed to be a container capable of storing a plurality of articles, and the article transfer device 37 is configured so as to transfer such containers to/from the storage unit 6 and the storage/retrieval portion 9. Although detailed descriptions and illustrations will be omitted, the article transfer device 37 includes, for example, a belt conveyor that transports articles B in the lateral direction of the path 2, and a secured extending/retracting device capable of extending and retracting in the lateral direction of the path 2 in a state in which an article B is secured, and therefore transfers containers by operating the belt conveyor and the secured extending/retracting device.

Although illustrations regarding the configuration that elevates/drops the vertically movable body 10 are omitted, the lower moving portion 13 can be provided with an elevator driving portion that takes up and lets out an elevator chain from which the vertically movable body 10 hangs and is supported so as to elevate/descend, as in the first embodiment; alternatively, for example, an elevator chain can be disposed across the entire length of the elevator path of the vertically movable body 10, the vertically movable body 10 can be provided with an elevator driving portion that rotationally drives in a state where it is connected to the elevator chain, and the vertically movable body 10 can be caused to elevate/drop by rotationally driving the elevator driving portion.

(Other Embodiments)

(1) Although the vertically movable body 10 is supported by the vertical guide 11 in a state in which it protrudes in a cantilever position toward the stacker crane 3 on the opposite side in the aforementioned first through third embodiments, the central portion, for example, of the vertically movable body 10 can be supported by the vertical guide 11 in the lateral direction of the path 2; thus the position at which the vertical guide 11 supports the vertically movable body 10 in the lateral direction of the path 2 can be changed as appropriate.

(2) Although the transit body 12 is provided with the lower moving portion 13 and the upper moving portion 14 driven in synchronization in the aforementioned first through third embodiments, the transit body 12 may be configured of the lower moving portion 13 only.

(3) Although the pair of vertical guide portions D are provided in a state in which the elevator driving portions 32 are driven in synchronization in correspondence therewith in the aforementioned first and second embodiments, an elevator driving portion 32 can be provided for only one of the pair of vertical guide portions D.

(4) Although the transit position of the transit body 12 is detected by the transit ranging device 56 in the aforementioned first through third embodiments, the means for detecting the transit position of the transit body 12 can be changed as appropriate. For example, the lower moving portion 13 can be provided with a rotary encoder that detects the transit distance from a reference position on the lower guide rail 7, and the transit position of the transit body 12 can then be detected using this rotary encoder. Furthermore, the means for detecting the elevation position of the vertically movable body 10 is not limited to the elevation ranging device 54, and can be changed as appropriate.

(5) Although the lower driving portion 17 and the upper driving portion 18 are provided above the ground surfaces in the aforementioned first and second embodiments, the lower moving portion 13 may be provided with an electric motor that rotationally drives the lower transit wheels 15, thus serving as the lower driving portion 17, and the upper moving portion 14 may be provided with an electric motor that rotationally drives the upper transit wheels 16, thus serving as the upper driving portion 18.

(6) Although the article transfer device 37 in configured so as to include the conveyor 38 and the pair of fork members 39 that are capable of extending/retracting in the aforementioned first and second embodiments, other various types of article transfer devices can be applied as well. Furthermore, although the vertically movable body 10 is provided with the article transfer device 37, an article transfer device can be provided in the storage rack 1.

(7) Although two each of the first stacker crane 3a and the second stacker crane 3b are provided in the aforementioned first and second embodiments, the number of first stacker cranes 3a and second stacker cranes 3b can be changed as appropriate.

(8) The configuration of the vertical guide 11 in the aforementioned first through third embodiments can be changed as appropriate; for example, a single elevator guide member created through aluminum extrusion molding by connecting a pair of support column portions arranged in the lengthwise direction of the path 2 with lattice portions can be provided as the vertical guide 11.

What is claimed is:

1. An article storage facility comprising:
a storage rack that includes a plurality of storage units that store articles and that are aligned in vertical and horizontal directions;
a first article transport that includes a first vertically movable body guided by a first vertical guide extending in the vertical direction to allow the first vertically movable body to move vertically and a first transit body configured to move along a path defined along said storage rack, the first vertical guide being provided in said first article transport so as to be positioned on one side of a lateral direction of the path, the first transit body being configured to move while being guided by a first guide rail provided on said one side of the lateral direction of the path; and
a second article transport that includes a second vertically movable body guided by a second vertical guide extending in the vertical direction to allow the second vertically movable body to move vertically and a second transit body configured to move along the path, the second vertical guide being provided in said second article transport so as to be positioned on the other side of the lateral direction of the path, the second transit body being configured to move while being guided by a second guide rail provided on said the other side of the lateral direction of the path;
wherein said first transit body and said second transit body are configured so as to be able to pass each other;
when viewed in the lengthwise direction of the path, said first vertical guide has a first surface that opposes said second vertical guide, said second vertical guide has a second surface that opposes said first vertical guide, and a distance between the first surface and the second surface when viewed in the lengthwise direction of the path is a set distance;
when the first vertically movable body is supported by the first vertical guide in an article transfer orientation for transferring one or more articles to or from one of the storage units, and the second vertically movable body is supported by the second vertical guide in its article transfer orientation, a first dimension at which the first vertically movable body protrudes with respect to the first surface of the first vertical guide is less than the set distance, and a second dimension at which the second vertically movable body protrudes with respect to the second surface of the second vertical guide is less than the set distance;
a sum of the first dimension and the second dimension is greater than the set distance;
the first vertical guide has a width in the lateral direction which is smaller than a width of the first transit body in the lateral direction;
the center of the first vertical guide in the lateral direction is disposed on a side away from the second vertical guide with an offset relative to the center in the lateral direction of the first guide rail in the lateral direction;
the second vertical guide has a width in the lateral direction which is smaller than a width of the second transit body in the lateral direction; and
the center of the second vertical guide in the lateral direction is disposed on a side away from the first vertical guide with an offset relative to the center in the lateral direction of the second guide rail in the lateral direction.

2. The article storage facility according to claim 1,
wherein said first article transport is configured such that the first vertical guide is positioned at an end of said one side of the lateral direction of the path;
said second article transport is configured such that the second vertical guide is positioned at an end of said the other side of the lateral direction of the path;
the first vertically movable body of said first article transport is, when viewed in the lengthwise direction of the path, supported only by the first vertical guide and protrudes toward the second vertical guide; and
the second vertically movable body of said second article transport is, when viewed in the lengthwise direction of the path, supported only by the second vertical guide and protrudes toward the first vertical guide.

3. The article storage facility according to claim 1,
wherein each of the first and second transit bodies includes a lower moving portion guided by a lower guide rail and an upper moving portion guided by an upper guide rail, the lower moving portion and upper moving portion being driven in synchronization; and each of the first and second vertical guides is provided between the upper moving portion and the lower moving portion such that each of the vertical guides is supported by the movement portions.

4. The article storage facility according to claim 1, wherein each of the first and second vertical guides is provided with a pair of vertical guide portions arranged in the lengthwise direction of the path;
each of the first and second vertically movable bodies is positioned between and guided by the corresponding pair of vertical guide portions so as to be allowed to move vertically; and
each of the pair of vertical guide portions has a pair of support columns aligned in the lengthwise direction of the path and angled auxiliary support columns that connect the pair of support columns.

5. The article storage facility according to claim 1, wherein each of the first and second vertical guides is provided with a pair of vertical guide portions arranged in the lengthwise direction of the path;
each of the first and second vertically movable bodies is positioned between and guided by the corresponding pair of vertical guide portions so as to be allowed to move vertically; and
each of the pair of vertical guide portions has one of a chain and a wire provided between an upper moving portion guided by an upper guide rail and a lower moving portion guided by a lower guide rail.

6. The article storage facility according to claim 1, wherein a plurality of at least one of said first article transport and said second article transport is provided in the path.

7. The article storage facility according to claim 1, wherein control means for controlling the operation of said first article transport and said second article transport is configured to cause the vertically movable bodies of the respective article transports to pass each other such that the vertically movable bodies are positioned in different positions in the vertical direction so as to avoid interference with each other.

8. The article storage facility according to claim 1, wherein, when viewed in the lengthwise direction of the path, the first vertical guide, as a whole, is disposed on the side away from the second vertical guide from the center in the lateral direction of the first guide rail, and the second vertical guide, as a whole, is disposed on the side away from the first vertical guide from the center in the lateral direction of the second guide rail.

9. The article storage facility according to claim 1, wherein the first guide rail includes a first lower guide rail disposed under the path;
the second guide rail includes a second lower guide rail disposed under the path;
the width in the lateral direction of the first vertical guide is smaller than a width in the lateral direction of an upper surface of the first lower guide rail; and
the width in the lateral direction of the second vertical guide is smaller than a width in the lateral direction of an upper surface of the second lower guide rail.

10. The article storage facility according to claim 9, wherein a distance between the first vertically movable body and the second surface is smaller than the width in the lateral direction of the upper surface of the second lower guide rail; and
a distance between the second vertically movable body and the first surface is smaller than the width in the lateral direction of the upper surface of the first lower guide rail.

11. The article storage facility according to claim 1, wherein each of the first and second vertical guides is provided with a pair of vertical guide portions arranged in the lengthwise direction of the path;
each of the first and second vertically movable bodies is positioned between and guided by the corresponding pair of vertical guide portions so as to be allowed to move vertically; and
each of the vertical guide portions of each of the vertical guides is provided with a driving device that takes up and lets out one of a chain and a wire with which the vertically movable body is suspended to be vertically movable, wherein the driving devices provided for the respective vertical guide portions in each of the vertical guides are driven in synchronization.

* * * * *